United States Patent
Jayaraman

(10) Patent No.: US 12,238,050 B2
(45) Date of Patent: Feb. 25, 2025

(54) DIGITAL FINANCIAL MANAGEMENT HAVING CHAT SUPPORT PLATFORM WITH MULTIPLE VIRTUAL CHAT COMMUNICATION SESSIONS CONDUCTED IN PARALLEL

(71) Applicant: Truist Bank, Charlotte, NC (US)

(72) Inventor: Barath Jayaraman, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/180,762

(22) Filed: Mar. 8, 2023

(65) Prior Publication Data

US 2024/0305587 A1    Sep. 12, 2024

(51) Int. Cl.
*H04L 51/02* (2022.01)
*G06F 3/0481* (2022.01)
*G06F 3/0484* (2022.01)

(52) U.S. Cl.
CPC ............ *H04L 51/02* (2013.01); *G06F 3/0481* (2013.01); *G06F 3/0484* (2013.01); *G06F 2203/04803* (2013.01)

(58) Field of Classification Search
CPC ..... H04L 51/02; G06F 3/0481; G06F 3/0484; G06F 2203/04803
See application file for complete search history.

(56) References Cited

U.S. PATENT DOCUMENTS

| | | | | |
|---|---|---|---|---|
| 5,838,318 A * | 11/1998 | Porter | .................... | G06F 3/0481 715/790 |
| 7,149,776 B1 * | 12/2006 | Roy | ....................... | G06F 16/954 715/239 |
| 8,443,297 B1 * | 5/2013 | Jitkoff | ................. | G06F 3/04812 715/802 |
| 8,726,189 B2 * | 5/2014 | Weber | .................... | G06F 16/957 715/810 |
| 10,938,755 B1 * | 3/2021 | MacMillin | .............. | G06F 9/542 |
| 10,992,604 B1 * | 4/2021 | Knas | ........................ | H04L 51/04 |
| 2001/0055036 A1 * | 12/2001 | Burstrom | .............. | G06F 3/0481 715/758 |
| 2002/0007396 A1 * | 1/2002 | Takakura | .............. | H04W 4/029 715/753 |
| 2002/0130904 A1 * | 9/2002 | Becker | .................. | G06F 3/0481 715/753 |
| 2003/0020671 A1 * | 1/2003 | Santoro | ..................... | G09G 5/14 345/1.3 |
| 2003/0046235 A1 * | 3/2003 | Lacivita | ............... | G06Q 20/341 705/44 |
| 2003/0097408 A1 * | 5/2003 | Kageyama | .......... | H04L 12/1818 709/205 |
| 2005/0144229 A1 * | 6/2005 | Kulkarni | ................ | G06Q 10/10 709/204 |

(Continued)

*Primary Examiner* — Michael Won
(74) *Attorney, Agent, or Firm* — Jordan IP Law, LLC; Michael A. Springs, Esq.

(57) ABSTRACT

A computing device, a computer program product, and a computer-implemented method for delivering enhanced financial services and, more particularly, for facilitating enhanced communication between a user and a financial institution via a client device. A digital financial management platform for the client device includes a chat support platform that facilitates multiple active virtual chat communication sessions involving the same user that are conducted simultaneously.

14 Claims, 18 Drawing Sheets

(56) References Cited

U.S. PATENT DOCUMENTS

| | | | |
|---|---|---|---|
| 2006/0129949 A1* | 6/2006 | Wu | G06F 3/0481 715/804 |
| 2006/0161859 A1* | 7/2006 | Holecek | G06F 3/048 715/781 |
| 2007/0033269 A1* | 2/2007 | Atkinson | H04L 67/53 709/219 |
| 2007/0043820 A1* | 2/2007 | George | H04L 51/04 709/207 |
| 2008/0071743 A1* | 3/2008 | Jhaveri | G06F 16/951 |
| 2008/0163090 A1* | 7/2008 | Cortright | H04L 51/046 709/206 |
| 2009/0007092 A1* | 1/2009 | Wolfe | G06F 9/54 717/173 |
| 2009/0049385 A1* | 2/2009 | Blinnikka | G06F 3/0481 715/719 |
| 2010/0031153 A1* | 2/2010 | Ortwein | G06F 9/542 715/733 |
| 2013/0232430 A1* | 9/2013 | Reitan | G09G 3/003 715/765 |
| 2014/0304346 A1* | 10/2014 | Song | H04L 51/212 709/206 |
| 2015/0319203 A1* | 11/2015 | Jeremias | G06F 3/0484 715/753 |
| 2016/0308799 A1* | 10/2016 | Schubert | H04L 67/535 |
| 2018/0096322 A1* | 4/2018 | D'Agostino | G06F 16/2425 |
| 2018/0255114 A1* | 9/2018 | Dharmaji | G06F 16/435 |
| 2019/0028591 A1* | 1/2019 | Kumar | G06F 9/547 |
| 2019/0349321 A1* | 11/2019 | Cai | G06N 3/006 |
| 2020/0097613 A1* | 3/2020 | Shah | H04L 67/141 |
| 2020/0127951 A1* | 4/2020 | Shah | H04L 12/1813 |
| 2020/0342175 A1* | 10/2020 | Gadde | G06F 16/3329 |
| 2021/0232644 A1* | 7/2021 | Shah | H04L 67/01 |
| 2021/0314282 A1* | 10/2021 | Sharma | H04L 65/1069 |
| 2021/0390268 A1* | 12/2021 | Pandey | G06N 5/025 |
| 2023/0252975 A1* | 8/2023 | Vishnoi | H04L 51/214 704/260 |

* cited by examiner

DIGITAL FINANCIAL MANAGEMENT HAVING CHAT SUPPORT PLATFORM WITH MULTIPLE VIRTUAL CHAT COMMUNICATION SESSIONS CONDUCTED IN PARALLEL

TECHNICAL FIELD

The present disclosure relates to a computing device, computer program product, and computer-implemented method for delivering digital financial services and, more particularly, for a chat support platform that facilitates multiple simultaneous virtual chat communication sessions between virtual chat support agents of the financial institution and a single user using a single client device.

BACKGROUND

Financial institutions that provide financial services are increasingly providing a greater number of client services. In order to alleviate call and chat density from customers over a network environment, such client services include automated virtual support agents (e.g., chatbots) who supplement human virtual support agents by directly interacting with customers via text chat, phone, instant messaging, etc.

SUMMARY

The present disclosure relates to a computing device, a computer program product, and a computer-implemented method for delivering enhanced digital financial services over a communication network by providing a digital financial management platform for a client device that includes a virtual chat communication platform that facilitates multiple simultaneous virtual chat communication sessions and an enhanced user virtual chat communication experience. The virtual chat communication platform enables a user to have a more efficient chat experience by enabling a client device to implement multiple chat communication sessions simultaneously. In that way, the user is not forced to cancel or end a first virtual chat communication session in order to commence two or more additional virtual chat communication sessions using the same client device. As described herein, a virtual chat communication session is an interactive session between a user using a client device and a virtual support agent (i.e., a human or automated assistant) associated with the financial institution.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to, during a first virtual chat communication session between a first virtual support agent of a financial institution on a first chat interface visually displayed on a user interface of a client device of a user executing a mobile application or desktop application associated with the financial institution over a communication network: receive a request from the user to open a second virtual chat communication session; and cause, in response to the received request, a visually display of a second chat interface on the user interface of the client device to facilitate the second virtual chat communication session between the user and a second virtual support agent of the financial institution, the first virtual chat communication session being active simultaneously with the second virtual chat communication session.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to, cause, during execution of a mobile application or desktop application associated with a financial institution by a client device of a user over a communication network, a visual display of a first chat interface on the client device to facilitate a first virtual chat communication session between the user and a first virtual support agent of the financial institution; and cause, in response to receiving a request from the user to open a second virtual chat communication session, a visually display of a second chat interface on the user interface of the client device to facilitate the second virtual chat communication session between the user and a second virtual support agent of the financial institution, the first virtual chat communication session being active simultaneously with the second virtual chat communication session.

In accordance with each respective apparatus, the second virtual support agent is a human virtual support agent.

In accordance with each respective apparatus, the second virtual support agent is an automated virtual support agent.

In accordance with each respective apparatus, the set of instructions, which when executed by the one or more processors, enable the apparatus to receive a text command of the request from the user to open the second virtual chat communication session in the first virtual chat communication session.

In accordance with each respective apparatus, temporally after receiving the request from the user and before causing the visual display of the second chat interface, the set of instructions, which when executed by the one or more processors, causes the apparatus to transmit a user-engageable link in the first chat interface that when engaged by the user, facilitates the visual display of the second chat interface.

In accordance with each respective apparatus, the set of instructions, which when executed by the one or more processors, cause the apparatus to display the first chat interface and the second chat interface as separate chat windows in separate locations on the user interface.

In accordance with each respective apparatus, the set of instructions, which when executed by the one or more processors, cause the apparatus to visually display the first chat interface and the second chat interface within a same chat window on the user interface.

In accordance with each respective apparatus, the set of instructions, which when executed by the one or more processors, causes the apparatus to enable the user to switch between the first virtual chat communication session and the second virtual chat communication session within the same chat window.

In accordance with each respective apparatus, the set of instructions, which when executed by the one or more processors, causes the apparatus to visually distinguish the first chat interface from the second chat interface on the basis of color.

In accordance with each respective apparatus, the set of instructions, which when executed by the one or more processors, causes the apparatus to visually associate the first virtual chat communication session using a first color and visually associate the second virtual chat communication session using a second color that is different from the first color.

In accordance with each respective apparatus, the set of instructions, which when executed by the one or more processors, causes the apparatus to enable the user to selectively associate the first virtual chat communication session using a first color and visually associate the second virtual chat communication session using a second color that is different from the first color.

In accordance with each respective apparatus, the set of instructions, which when executed by the one or more processors, causes the apparatus to enable the user to enter text messages in the first chat interface using a first font color and enter text messages in the second chat interface having a second font color that is different from the first font color.

In accordance with one or more embodiments set forth, illustrated, and described herein, a computer program product comprising a computer program product comprising at least one non-transitory computer readable medium having with a set of instructions of computer-executable program code, which when executed by one or more processors of a computing device, cause the computing device to, during a first virtual chat communication session between a first virtual support agent of a financial institution on a first chat interface visually displayed on a user interface of a client device of a user executing a mobile application or desktop application associated with the financial institution over a communication network: receive a request from the user to open a second virtual chat communication session; and cause, in response to the received request, a visually display of a second chat interface on the user interface of the client device to facilitate the second virtual chat communication session between the user and a second virtual support agent of the financial institution, the first virtual chat communication session being active simultaneously with the second virtual chat communication session.

In accordance with one or more embodiments set forth, illustrated, and described herein, a computer program product comprising a computer program product comprising at least one non-transitory computer readable medium having with a set of instructions of computer-executable program code, which when executed by one or more processors of a computing device, cause the computing device to: cause, during execution of a mobile application or desktop application associated with a financial institution by a client device of a user over a communication network, a visual display of a first chat interface on the client device to facilitate a first virtual chat communication session between the user and a first virtual support agent of the financial institution; and cause, in response to receiving a request from the user to open a second virtual chat communication session, a visually display of a second chat interface on the user interface of the client device to facilitate the second virtual chat communication session between the user and a second virtual support agent of the financial institution, the first virtual chat communication session being active simultaneously with the second virtual chat communication session.

In accordance with each respective computer program product, the second virtual support agent is a human virtual support agent.

In accordance with each respective computer program product, the second virtual support agent is an automated virtual support agent.

In accordance with each respective computer program product, the set of instructions, which when executed by the one or more processors, enable the computing device to receive a text command of the request from the user to open the second virtual chat communication session in the first virtual chat communication session.

In accordance with each respective computer program product, temporally after receiving the request from the user and before causing the visual display of the second chat interface, the set of instructions, which when executed by the one or more processors, causes the computing device to transmit a user-engageable link in the first chat interface that when engaged by the user, facilitates the visual display of the second chat interface.

In accordance with each respective computer program product, the set of instructions, which when executed by the one or more processors, cause the computing device to display the first chat interface and the second chat interface as separate chat windows in separate locations on the user interface.

In accordance with each respective computer program product, the set of instructions, which when executed by the one or more processors, cause the computing device to visually display the first chat interface and the second chat interface within a same chat window on the user interface.

In accordance with each respective computer program product, the set of instructions, which when executed by the one or more processors, causes the computing device to enable the user to switch between the first virtual chat communication session and the second virtual chat communication session within the same chat window.

In accordance with each respective computer program product, the set of instructions, which when executed by the one or more processors, causes the computing device to visually distinguish the first chat interface from the second chat interface on the basis of color.

In accordance with each respective computer program product, the set of instructions, which when executed by the one or more processors, causes the computing device to visually associate the first virtual chat communication session using a first color and visually associate the second virtual chat communication session using a second color that is different from the first color.

In accordance with each respective computer program product, the set of instructions, which when executed by the one or more processors, causes the computing device to enable the user to selectively associate the first virtual chat communication session using a first color and visually associate the second virtual chat communication session using a second color that is different from the first color.

In accordance with each respective computer program product, the set of instructions, which when executed by the one or more processors, causes the computing device to enable the user to enter text messages in the first chat interface having a first font color and enter text messages in the second chat interface having a second font color that is different from the first font color.

In accordance with one or more embodiments set forth, illustrated, and described herein, a computer-implemented method may comprise one or more of the following: causing, by one or more financial institution servers associated with a financial institution during execution of a mobile application or desktop application associated with a financial institution by a client device of a user over a communication network, a visual display of a first chat interface on the client device to facilitate a first virtual chat communication session between the user and a first virtual support agent of the financial institution; and causing, by the one or more financial institution servers in response to receiving a request from the user to open a second virtual chat communication session, a visually display of a second chat interface on the user interface of the client device to facilitate the second virtual chat communication session between the user and a second virtual support agent of the financial institution, the first virtual chat communication session being active simultaneously with the second virtual chat communication session.

In accordance with each respective computer-implemented method, the second virtual support agent is a human virtual support agent.

In accordance with each respective computer-implemented method, the second virtual support agent is an automated virtual support agent.

In accordance with each respective computer-implemented method, further comprising, by the one or more financial institution servers, enabling the computing device to receive a text command of the request from the user to open the second virtual chat communication session in the first virtual chat communication session.

In accordance with each respective computer-implemented method, further comprising, by the one or more financial institution servers temporally after receiving the request from the user and before causing the visual display of the second chat interface, causing the computing device to transmit a user-engageable link in the first chat interface that when engaged by the user, facilitates the visually display of the second chat interface.

In accordance with each respective computer-implemented method, further comprising, by the one or more financial institution servers, causing the computing device to visually display the first chat interface and the second chat interface as separate chat windows in separate locations on the user interface.

In accordance with each respective computer-implemented method, further comprising, by the one or more financial institution servers, causing the visual display the first chat interface and the second chat interface within a same chat window on the user interface.

In accordance with each respective computer-implemented method, further comprising, by the one or more financial institution servers, enabling the user to switch between the first virtual chat communication session and the second virtual chat communication session within the same chat window.

In accordance with each respective computer-implemented method, further comprising, by the one or more financial institution servers, to visually distinguishing the first chat interface from the second chat interface on the basis of color.

In accordance with each respective computer-implemented method, further comprising, by the one or more financial institution servers, visually associating the first virtual chat communication session using a first color and visually associate the second virtual chat communication session using a second color that is different from the first color.

In accordance with each respective computer-implemented method, further comprising, by the one or more financial institution servers, enabling the user to selectively associate the first virtual chat communication session using a first color and visually associate the second virtual chat communication session using a second color that is different from the first color.

In accordance with each respective computer-implemented method, further comprising, by the one or more financial institution servers, enabling the user to enter text messages in the first chat interface having a first font color and enter text messages in the second chat interface having a second font color that is different from the first font color.

DRAWINGS

The various advantages of the exemplary embodiments will become apparent to one skilled in the art by reading the following specification and appended claims, and by referencing the following drawings, in which:

Figure 11:
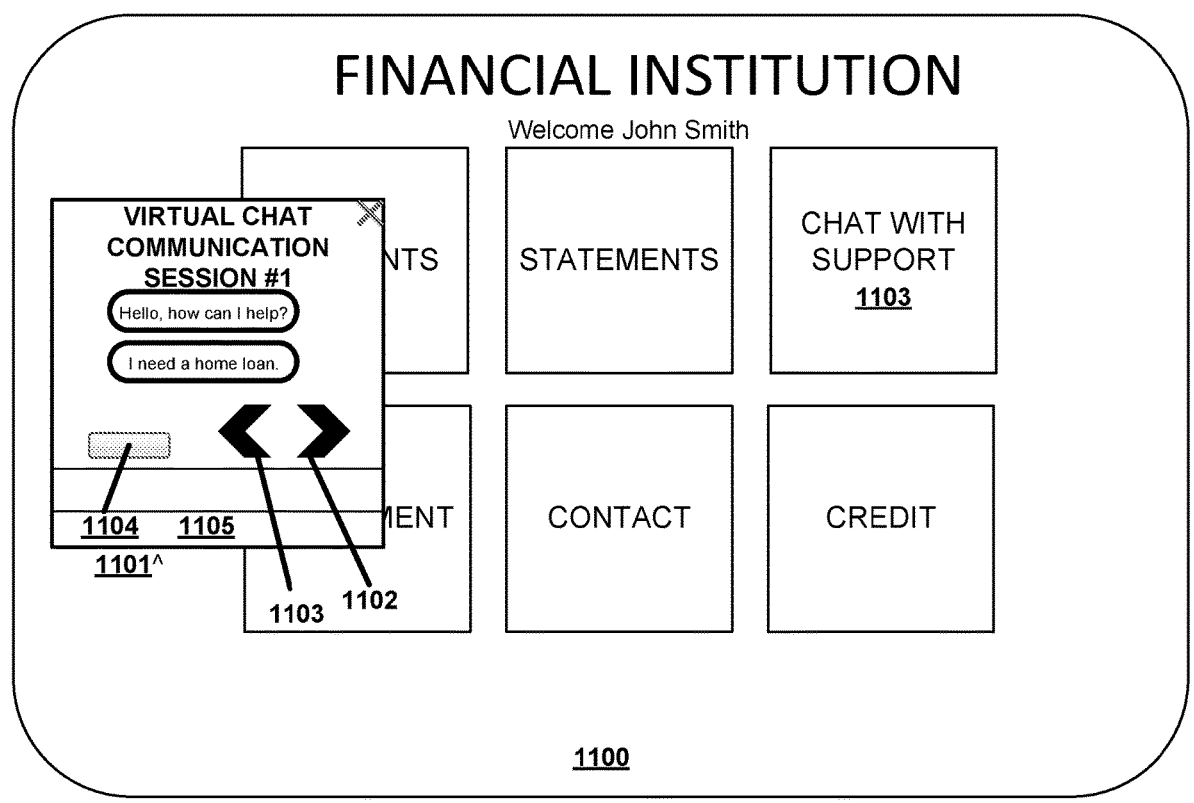
Figure 12:
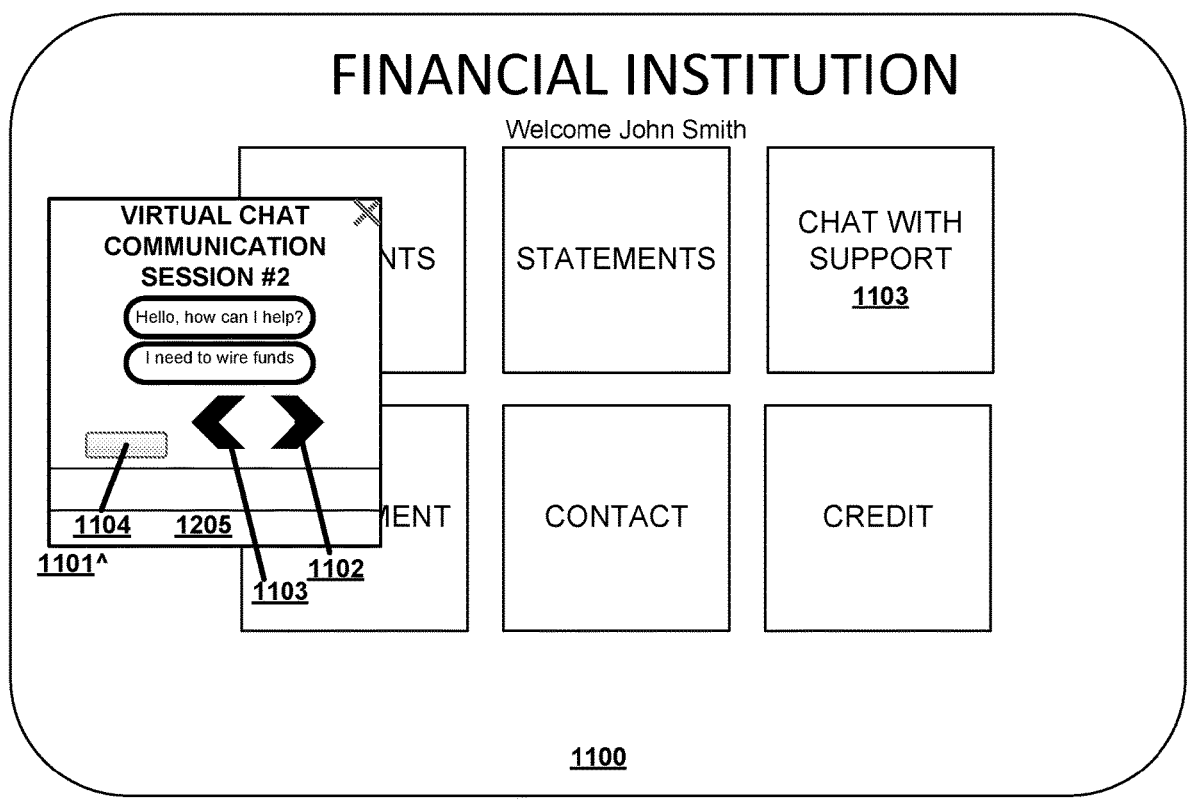

FIGS. 11 and 12 respectively illustrate a GUI comprising a single chat widget which supports a plurality of chat windows superimposed on a dashboard, in accordance with one or more embodiments set forth and described herein.

Figure 13:
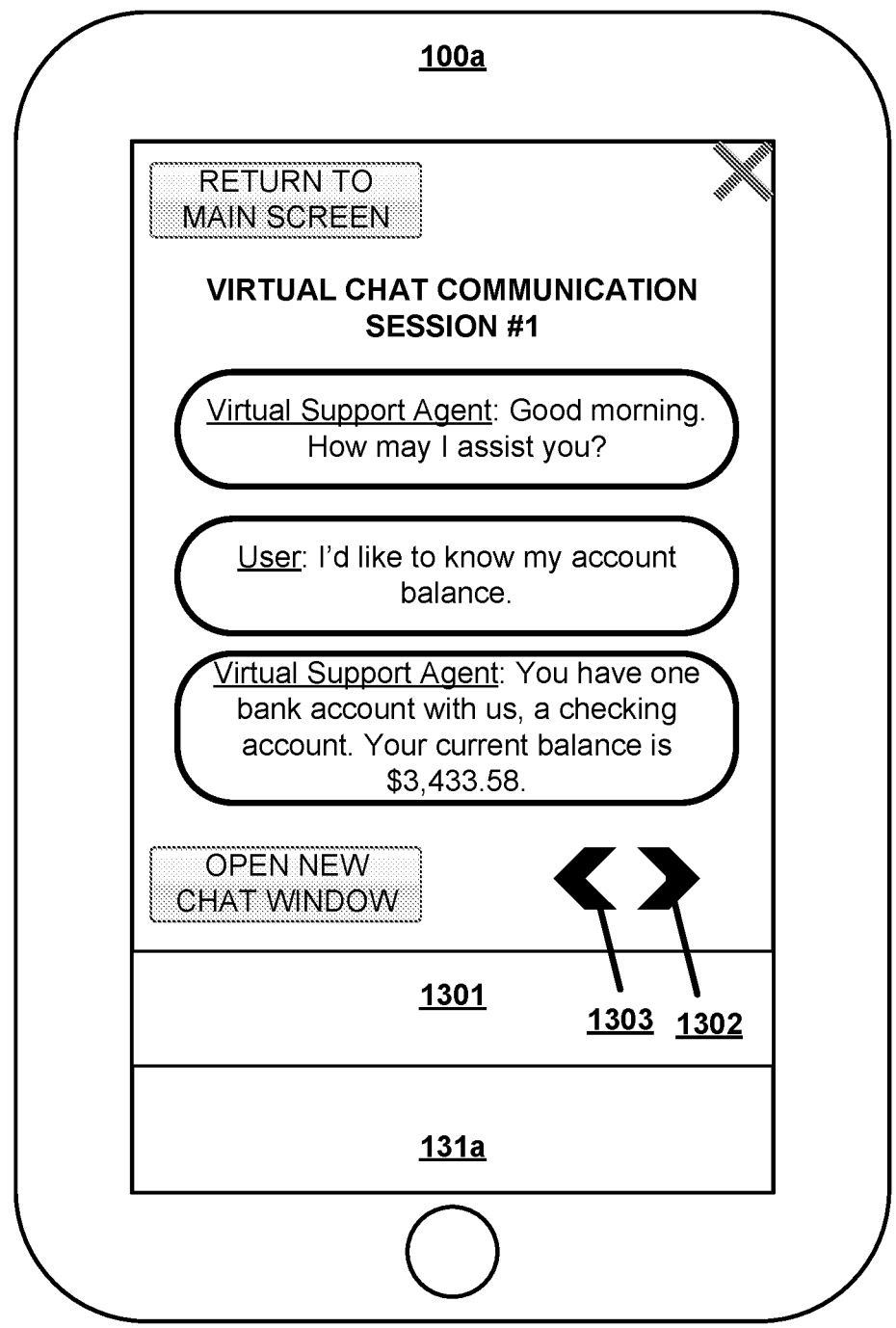
Figure 14:
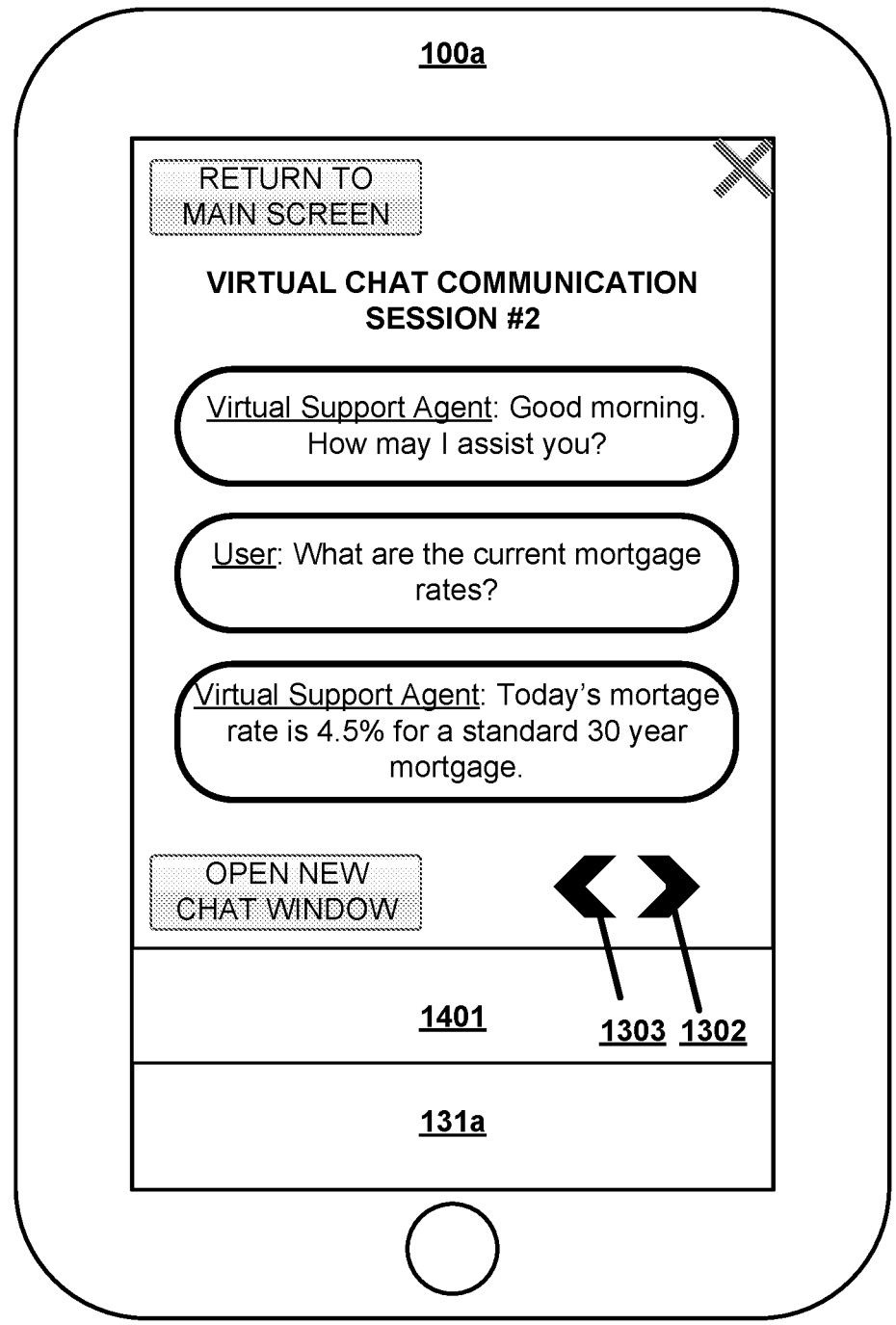

FIGS. 13 and 14 respectively illustrate a GUI for a financial institution app executing on a mobile device, with a single chat widget which supports multiple chat windows, in accordance with one or more embodiments set forth and described herein.

Figure 15:
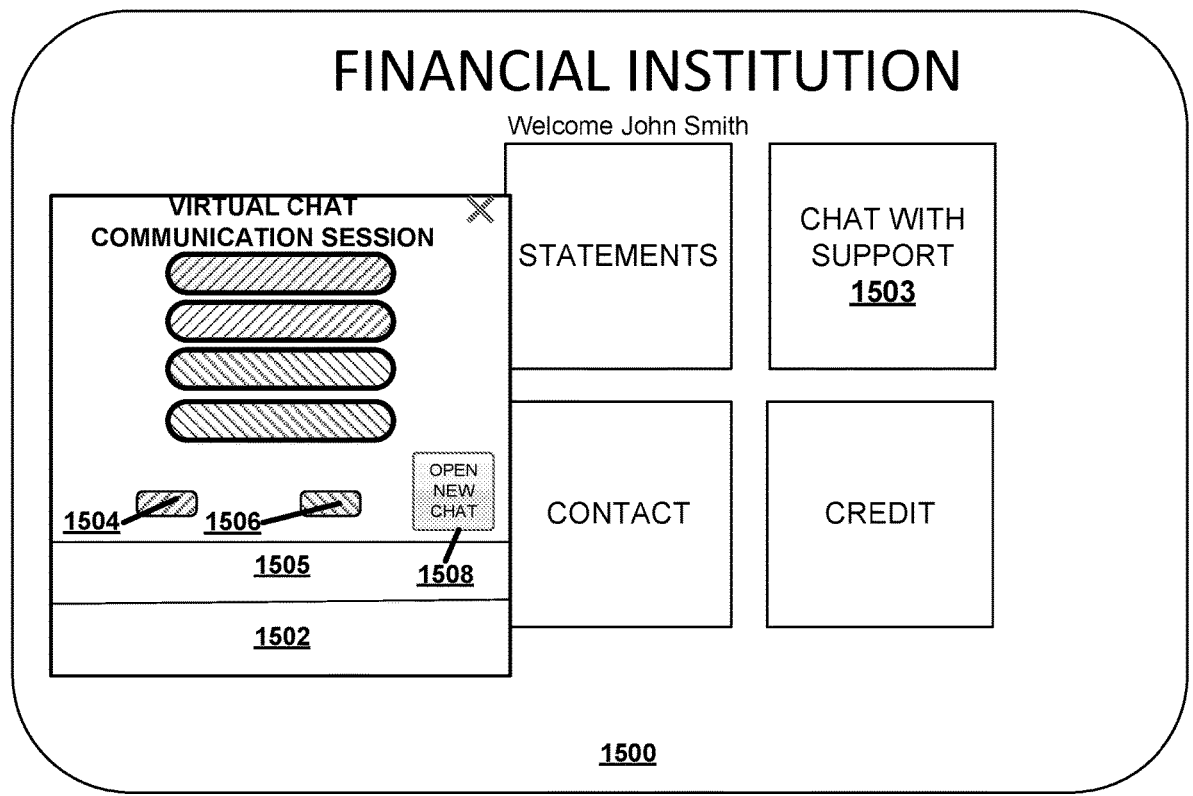

FIG. 15 illustrates a GUI comprising a single window which utilizes different colors for each chat communication session, in accordance with one or more embodiments set forth and described herein.

Figure 16:
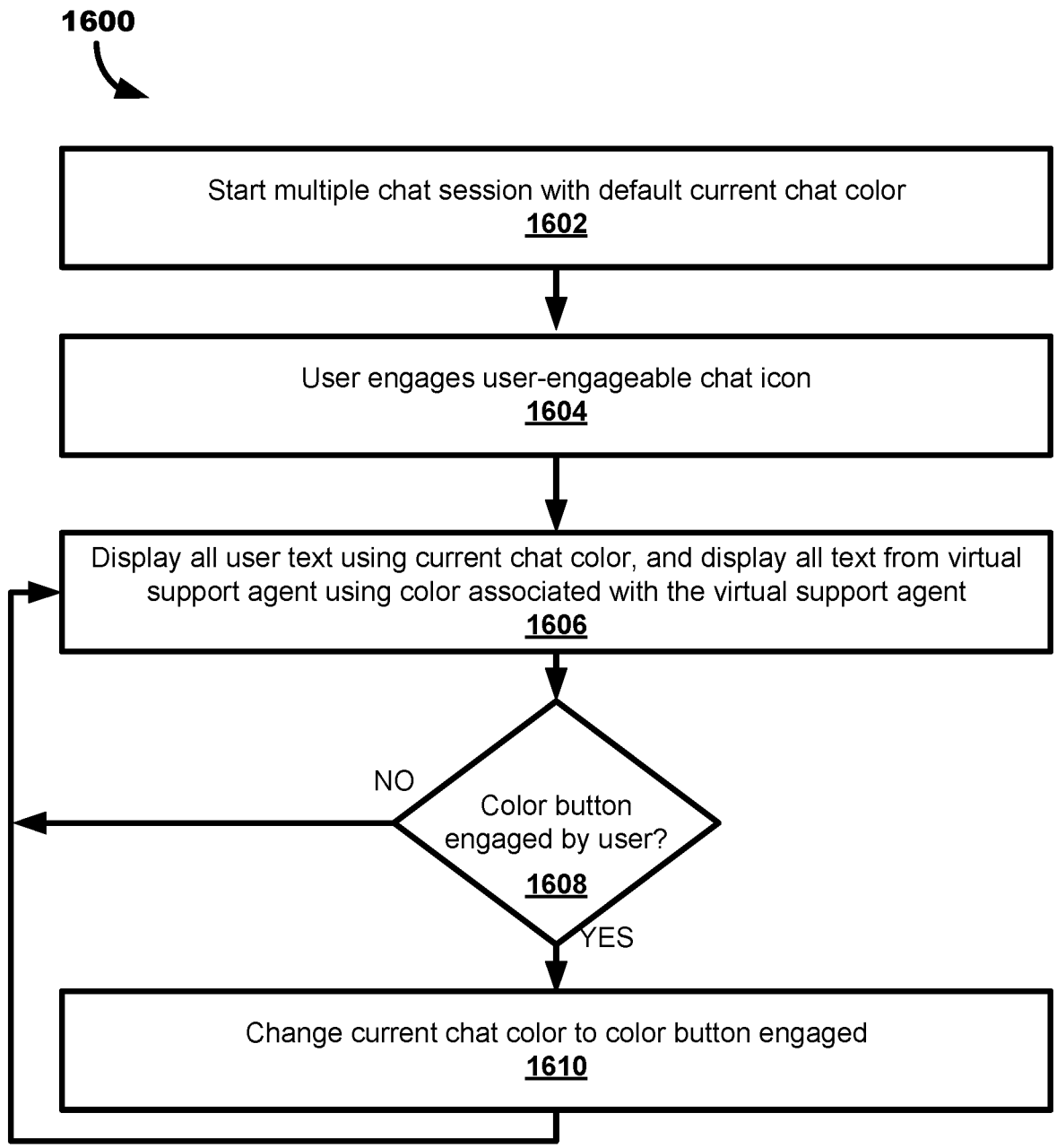

FIG. 16 illustrates a computer-implemented method for utilizing a single chat window which utilizes different colors for each chat communication session, in accordance with one or more embodiments set forth and described herein.

Figure 17:
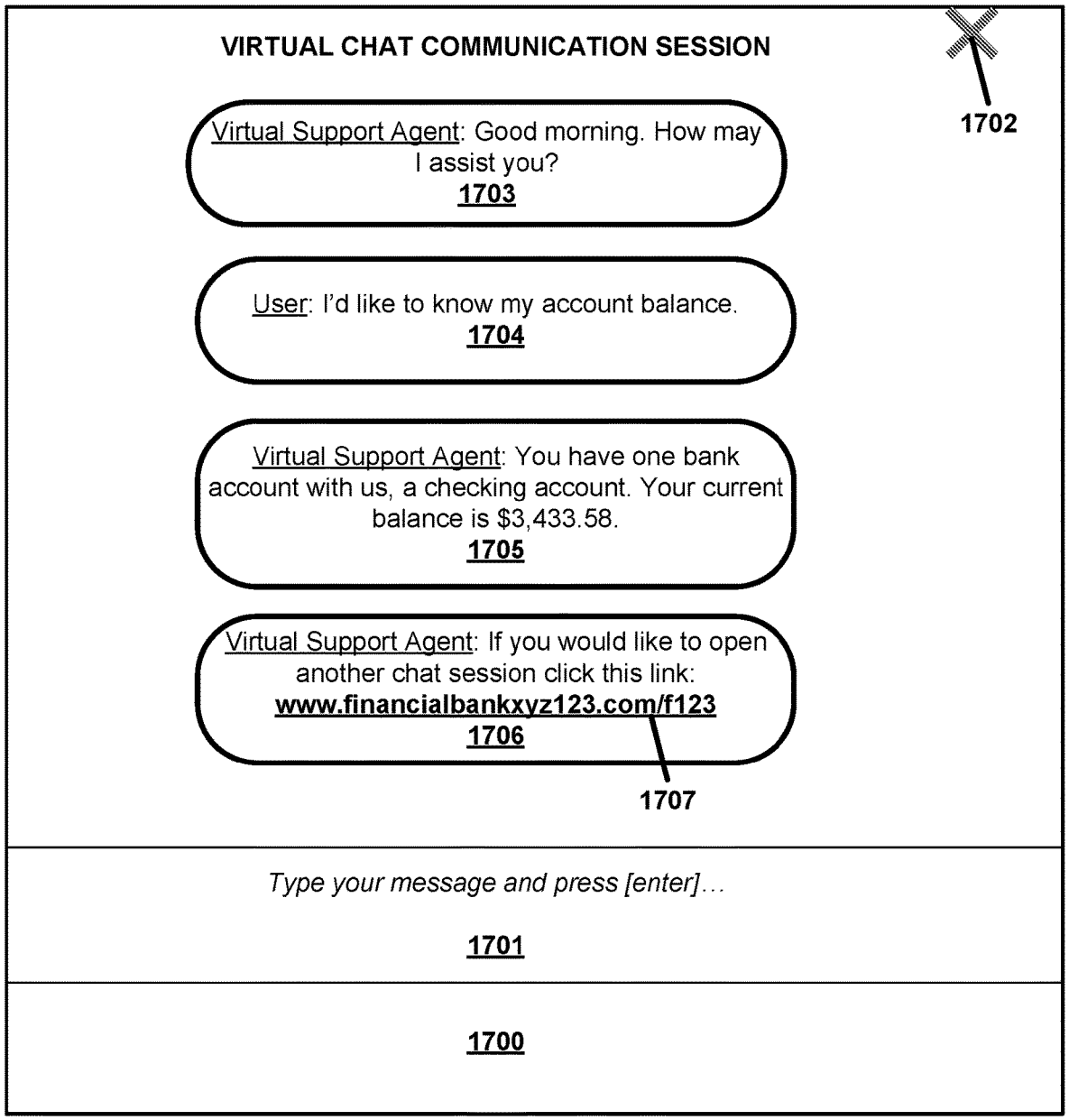

FIG. 17 illustrates a computer implemented method for transmitting a link which opens a new virtual chat communication session, in accordance with one or more embodiments set forth and described herein.

Figure 18:
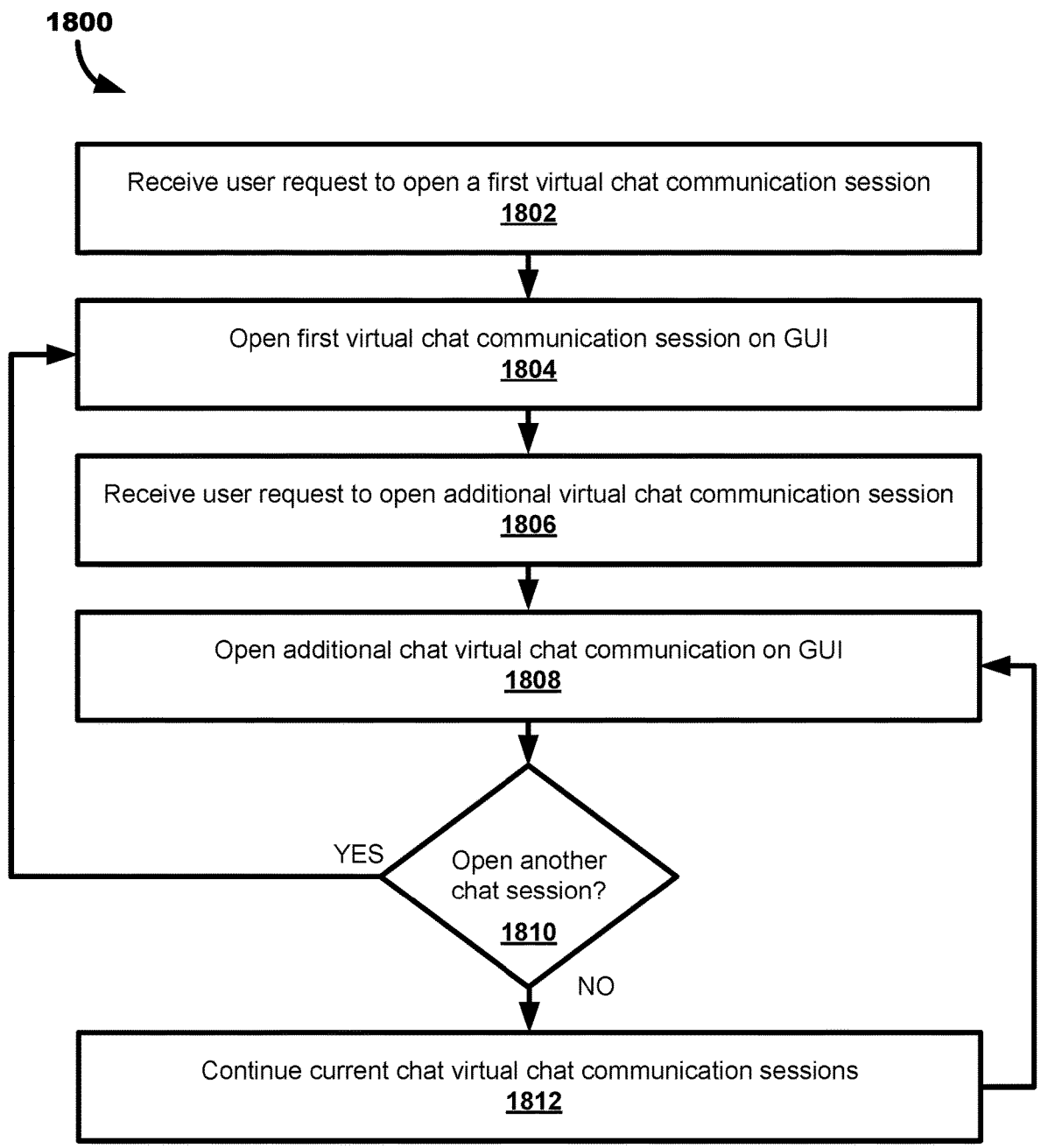

FIG. 18 illustrates a computer-implemented method, in accordance with one or more embodiments set forth and described herein.

DESCRIPTION

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code executing on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a virtual chat communication platform is provided for a client device of a user having one or more financial accounts residing at one or more financial institution servers of a financial institution. The virtual chat communication platform enables a single user, using a single client device, to participate in multiple simultaneous virtual chat communication sessions with virtual support agents acting on behalf of the financial institution in support of serving the needs of the user. In that way, the user is not forced to cancel or end a first virtual chat communication session in order to commence two or more additional virtual chat communication sessions using the same client device.

Figure 1:
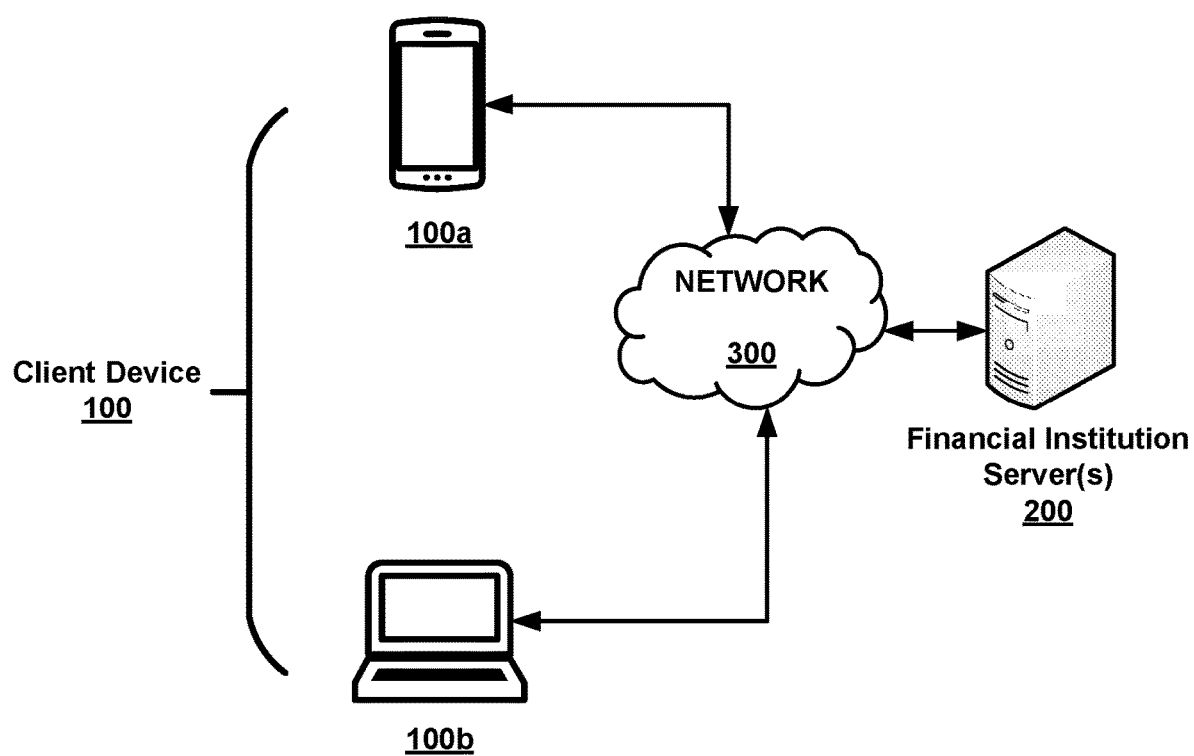
FIG. 1 illustrates a communication environment, in accordance with one or more embodiments set forth and described herein.

Turning to the figures, in which FIG. 1 illustrates a communication environment that facilitates communications between a user and a financial institution. A client device 100 of a user (financial account holder) operating in the communication environment facilitates user access to and user management of one or more financial accounts residing at one or more financial institution servers 200 of the financial institution. The communication environment includes the client device 100, the one or more financial institution servers 200, and a communication network 300 through which communication is facilitated between the client device 100 and the one or more financial institution servers 200.

In accordance with one or more embodiments set forth, described, and/or illustrated herein, the client device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the client device 100 comprising any form of electronic device that optimizes or otherwise transforms the performance and functionality of the one or more embodiments in a manner that falls within the spirit and scope of the principles of this disclosure.

Figure 2:
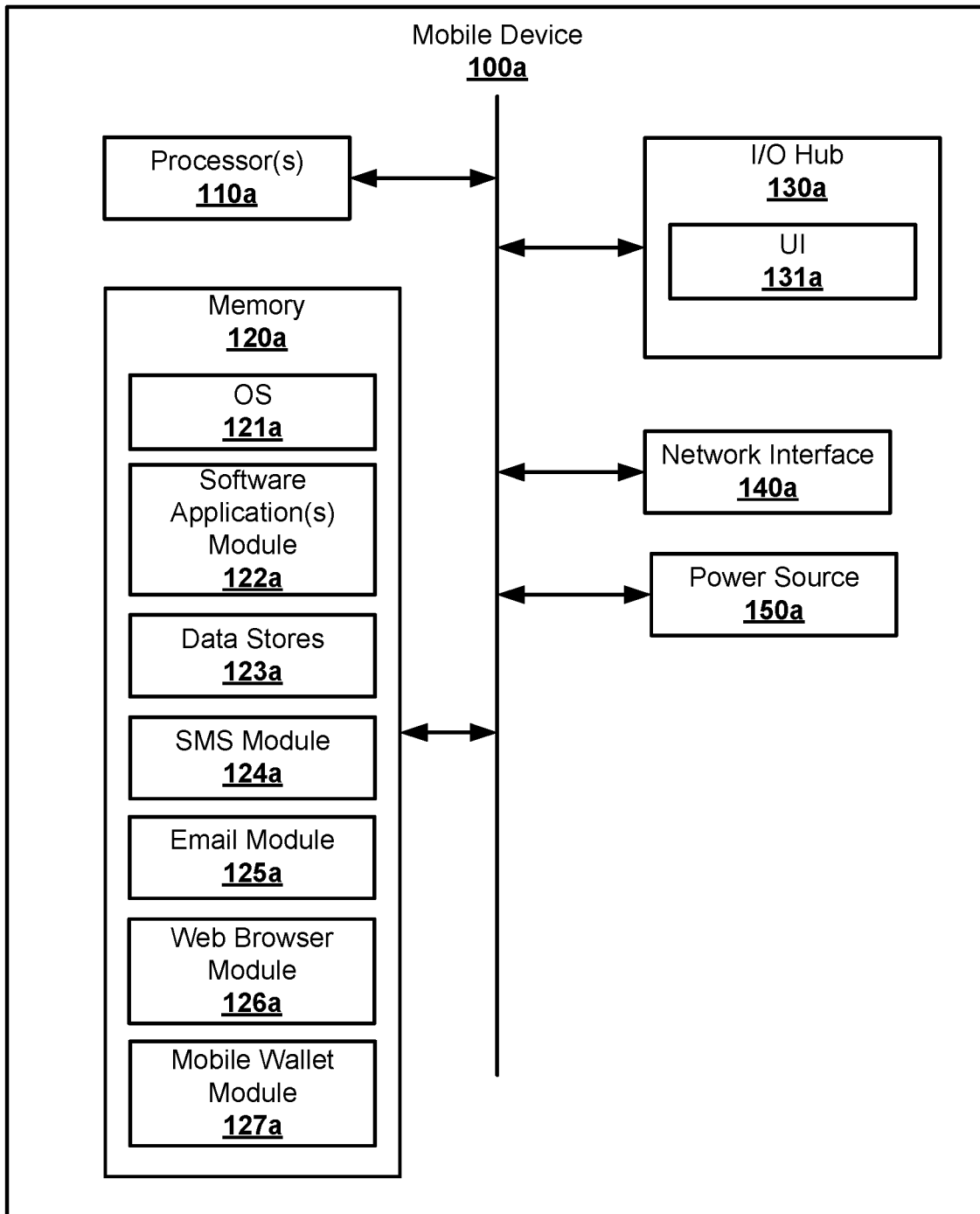
FIG. 2 illustrates a block diagram of the first client device of FIG. 1.

In the illustrated example embodiment of FIG. 2, the client device 100 comprises a mobile device 100a. Some of the possible operational elements of the mobile device 100a are illustrated in FIG. 2 and will now be described herein. It will be understood that it is not necessary for the mobile device 100a to have all the elements illustrated in FIG. 2. For example, the mobile device 100a may have any combination of the various elements illustrated in FIG. 2. Moreover, the mobile device 100a may have additional elements to those illustrated in FIG. 2.

The mobile device 100a includes one or more processors 110a, a non-transitory memory 120a operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause execution of an operating system 121a and one or more software applications of a software application module 122a that reside in the memory 120a. The one or more software applications residing in the memory 120a includes, but is not limited to, a financial institution application that is associated with the financial institution. The financial institution application comprises a mobile application or desktop application that facilitates establishment of a secure connection between the mobile device 100a and the one or more financial institution servers 200. The one or more processors 110a are operable to execute the mobile application or desktop application to facilitate user access to the one or more financial accounts and user management of the one or more financial accounts.

The memory 120a also includes one or more data stores 123a that are operable to store one or more types of data. The mobile device 100a may include one or more interfaces that facilitate one or more systems or modules thereof to transform, manage, retrieve, modify, add, or delete, the data residing in the data stores 123a. The one or more data stores 123a may comprise volatile and/or non-volatile memory. Examples of suitable data stores 123a include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a may be a component of the one or more processors 110a or alternatively, may be operatively connected to the one or more processors 110a for use thereby. As set forth, described, and/or illustrated herein, "operatively connected" may include direct or indirect connections, including connections without direct physical contact.

The memory 120a also includes an SMS module 124a operable to facilitate user transmission and receipt of text messages via the mobile device 100a though the network 300. In one example embodiment, the user may receive text messages from the financial institution that are associated with the user access and the user management of the one or more financial accounts. An email module 125a is operable to facilitate user transmission and receipt of email messages via the mobile device 100a through the network 300. In one example embodiment, the user may receive email messages from the financial institution that are associated with the user access and the user management of the one or more financial accounts. The user may utilize a web browser module 126a that is operable to facilitate user access to one or more websites associated with the financial institution through the network 300. A digital wallet module 127a facilitates the generation of one or more digital wallets associated with the one or more financial accounts.

In accordance with one or more embodiments set forth, described, and/or illustrated herein, the mobile device 100a includes an I/O hub 130a operatively connected to other systems and subsystems of the mobile device 100a. The I/O system 130a may include one or more of an input interface, an output interface, and a network controller to facilitate communications between the mobile device 100a and the one or more financial institution servers 200. The input interface and the output interface may be integrated as a single, unitary user interface 131a, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The mobile device 100a also includes a network interface 140a operable to facilitate connection to the network 300. The mobile device 100a further includes a power source 150a that comprises a wired powered source, a wireless power source, a replaceable battery source, or a rechargeable battery source.

Figure 3:
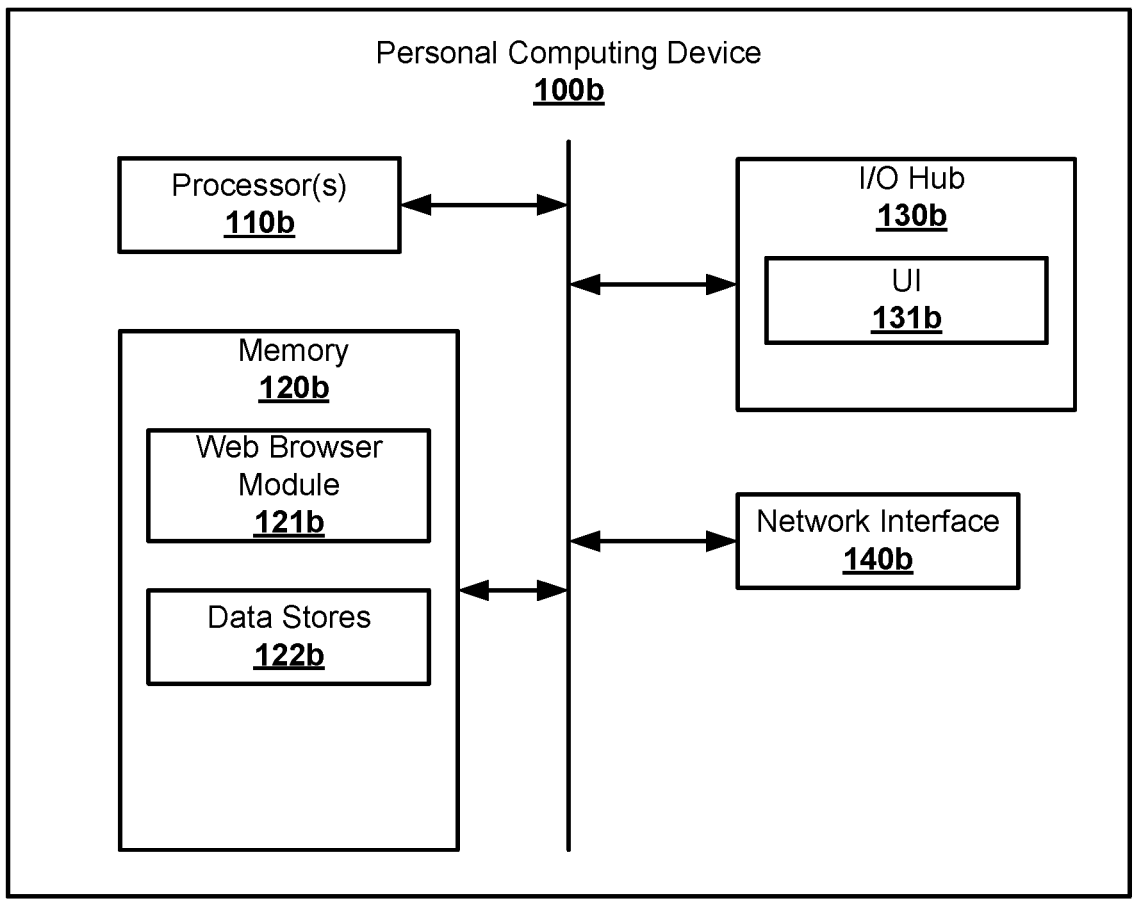
FIG. 3 illustrates a block diagram of the second client device of FIG. 1.

In the illustrated example embodiment of FIG. 3, the client device 100 comprises a personal computing device 100b. Some of the possible operational elements of the personal computing device 100b are illustrated in FIG. 3 and will now be described herein. It will be understood that it is not necessary for the personal computing device 100b to have all the elements illustrated in FIG. 3. For example, the personal computing device 100b may have any combination of the various elements illustrated in FIG. 3. Moreover, the personal computing device 100b may have additional elements to those illustrated in FIG. 3.

The personal computing device 100b includes one or more processors 110b, a non-transitory memory 120b operatively coupled to the one or more processors 110A, an I/O hub 130b, and a network interface 140b.

The memory 120b comprises a set of instructions of computer-executable program code. The set of instructions are executable by the one or more processors 110b to cause control of the web browser module 121b in a manner that facilitates user access to a web browser having one or more websites associated with the financial institution through the network 300.

The memory 120b also includes one or more data stores 122b that are operable to store one or more types of data. The personal computing device 100b may include one or more interfaces that facilitate one or more systems or modules thereof to transform, manage, retrieve, modify, add, or delete, the data residing in the data stores 122b. The one or more data stores 122b may comprise volatile and/or non-volatile memory. Examples of suitable data stores 122b include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122b may be a component of the one or more processors 110b, or alternatively, may be operatively connected to the one or more processors 110b for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 100b may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110b may comprise at least one hardware circuit (e.g., an integrated circuit) operable to carry out instructions contained in program code. In embodiments in which there is a plurality of processors, such processors may work independently from each other, or one or more processors may work in combination with each other.

In accordance with one or more embodiments set forth, described, and/or illustrated herein, the personal computing device 100a includes an I/O hub 130b operatively connected to other systems and subsystems of the personal computing device 100a. The I/O system 130b may include one or more of an input interface, an output interface, and a network controller to facilitate communications between the personal computing device 100a and the one or more financial institution servers 200. The input interface and the output interface may be integrated as a single, unitary user interface 131b, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110b to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The personal computing device 100b also includes a network interface 140b operable to facilitate connection to the network 300.

Figure 4:
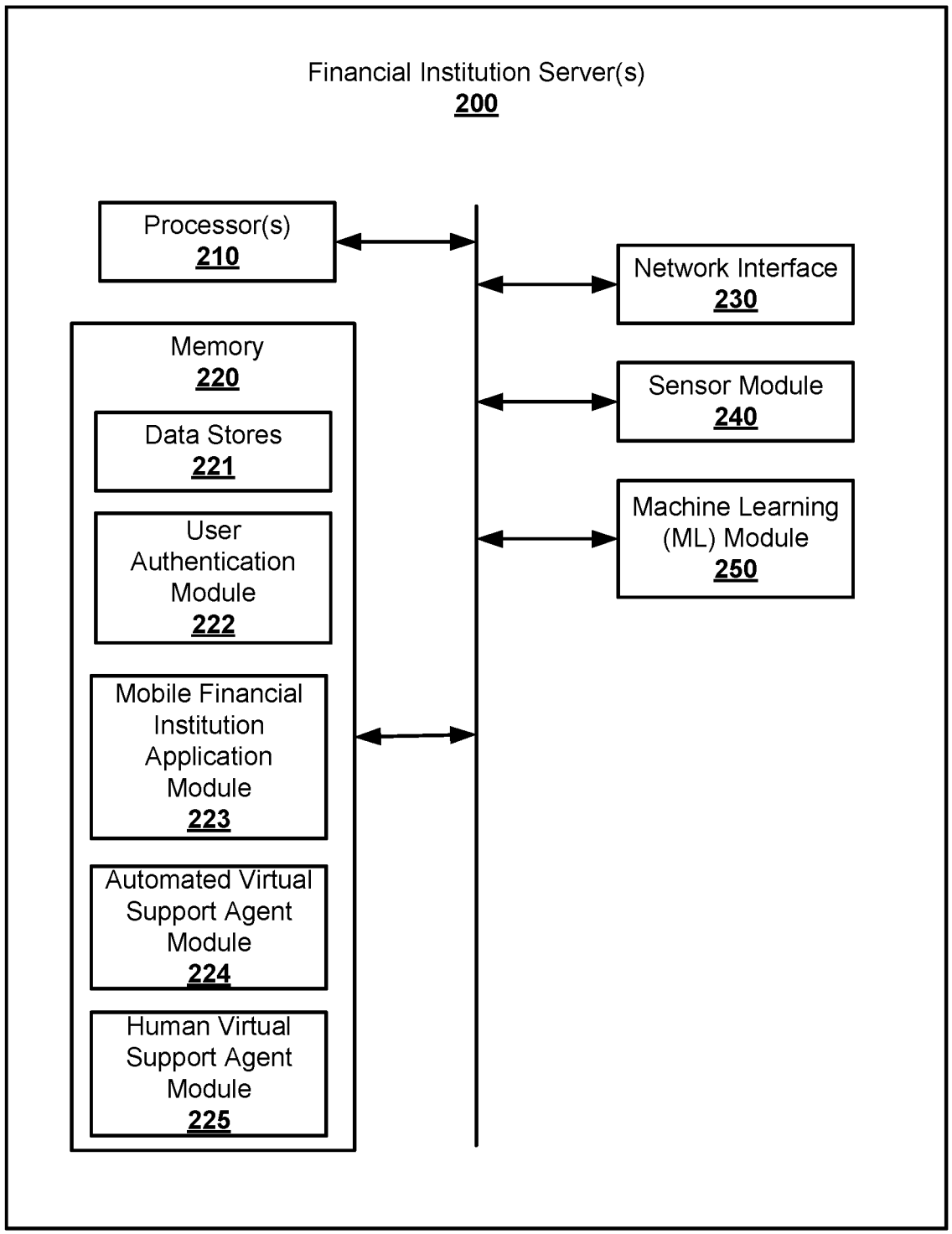
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222, a mobile financial institution application module 223 having one or more mobile financial institution applications that reside in the memory 220, an automated virtual support agent module 224, and a human virtual support agent module 225. In accordance with one or more embodiments set forth, described, and/or illustrated herein, the one or more financial institution servers 200 may individually or collectively execute the instructions to perform any one or more of the methodologies set forth, described, and illustrated herein.

The memory 220 also includes one or more data stores 221 that are operable to store one or more types of data, including but not limited to, user account data, user authentication data, sensor data, etc. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the one or more financial institution servers 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The memory 220 can store computer readable program code and data which, when executed by the one or more processors 210 (or other processor) can implement (or cause to be implemented) any of the features and methodologies described herein.

The computer-executable program code may instruct the one or more processors 210 to cause the user authentication module 221 to authenticate a user in order to gain user access to the one or more financial accounts. The user authentication module 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 222 are operable to communicate with the first client device 100*a* and the second client device 100*b* in a manner which facilitates user access to the one or more financial accounts in addition to user management of the one or more financial accounts based on successful user authentication.

The sensor module 240 is operable, at least during execution of the mobile application or desktop application by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the client device 100 and the one or more financial institution servers 200, while also enhancing user access and management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute a mobile application or desktop application associated with the financial institution over the communication network 300.

Figure 5:
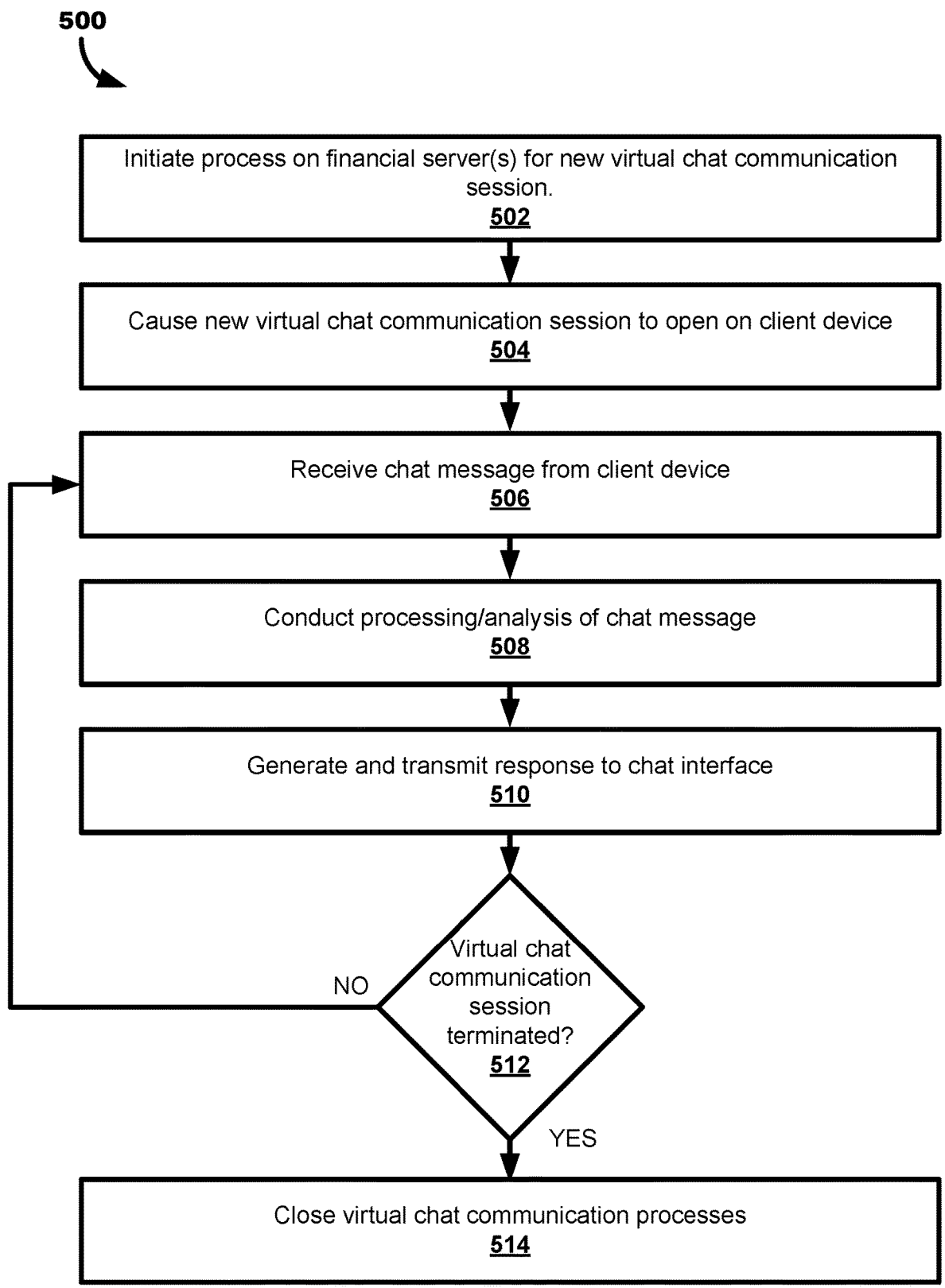
FIG. 5 illustrates a computer-implemented method for implementing a chat communication session with a virtual support agent, in accordance with one or more embodiments set forth and described herein.
Figure 6:
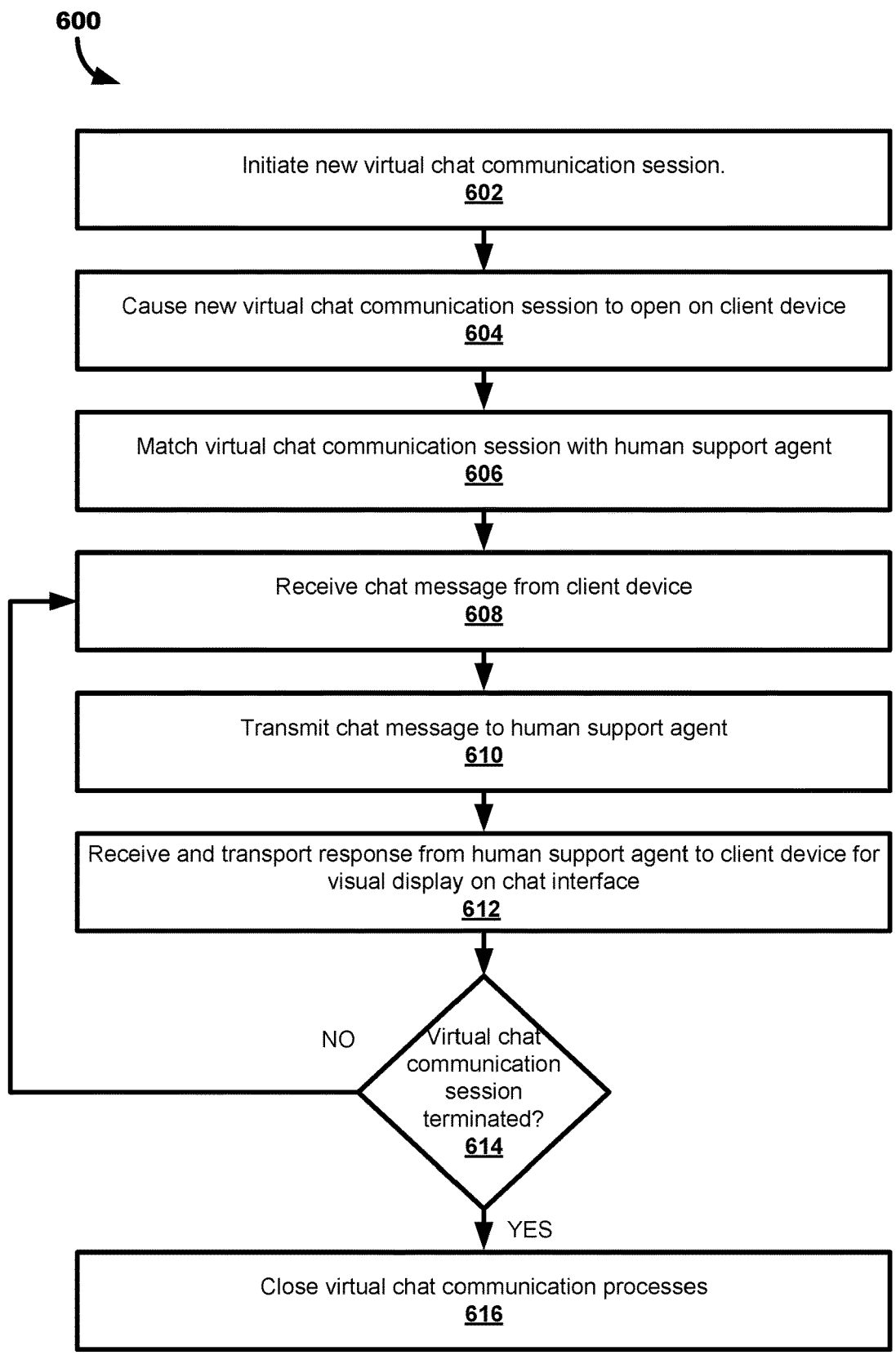
FIG. 6 illustrates a computer-implemented method for implementing a chat communication session with a human virtual support agent, in accordance with one or more embodiments set forth and described herein.

Illustrated examples shown in FIGS. 5 to 6 set forth computer-implemented methods 500 and 600. In one or more examples, the respective flowcharts of the computer-implemented methods 500 and 60 may be implemented by the one or more processors 210 of the one or more financial institution servers 200. In particular, the computer-implemented methods 500 and 600 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 500 and 600 set forth, described, and/or illustrated herein, or provides functionality set forth, described, and/or illustrated.

As illustrated in FIG. 5, a computer-implemented method can implement a virtual chat communication session between a user and a virtual support agent, in accordance with one or more embodiments set forth and described herein.

Illustrated process block 502 causes the one or more processors 210 to initiate a new dedicated process in order to facilitate a new virtual chat communication session. This initiation may include such operations as allocating memory, adding the new virtual chat communication session to a chat queue (of all virtual chat communication sessions administered by the financial institution server(s) 200), and all other such tasks.

From illustrated process block 502, the computer-implemented method proceeds to illustrated process block 504, which causes a visual display of a GUI comprising a chat interface on the client device 100. A virtual chat communication session can be conducted on a stand-alone chat interface comprising a chat window, or a chat window superimposed over a chat widget (discussed further herein), or any GUI which functions to facilitate a virtual chat communication session between a user and a virtual support agent. The one or more processors 210 would communicate with a process executing on the client device 100 so that the process (could be an application program executing on the client device, a web browser, the operating system on the client device 100, etc.) instructs the client device 100 to open the new virtual chat communication session by utilizing a GUI on the interface 131*a*, 131*b* of the client device 100.

From illustrated process block 504, the computer-implemented method proceeds to illustrated process block 506, which receives a chat message (verbal and/or textual) entered into the GUI by the user on the client device 100.

From illustrated process block 506, the computer-implemented method 500 proceeds to illustrated process block 508, which processes or analyzes (e.g., via parsing and/or natural language processing (NLP)) the contents of the chat message. For example, the computer-executable program code may instruct the one or more processors 210 to process or analyze the content of the chat message transmitted by the user by separating the words contained in the text and analyzing the text (using one or more such techniques, such as a rules-based system, a machine learning model (such as a convolution neural network), natural language processing (NLP), text mining, or the like.) The computer-executable program code may instruct the one or more processors 210 to generate a response to the chat message using the one or more such techniques, which may include querying a database in memory 220 to retrieve the response. For example, should the user provide a text query "what is my account balance?," the text analyzer would analyze the text to determine that there is an unknown quantity needed (the user's account balance), and then query the one or more financial institution server(s) 200 to retrieve the quantity needed (the user's account balance).

From illustrated process block 508, the computer-implemented method 500 proceeds to illustrated process block 510, which generates and transmits by causing a visual display of a response (e.g., "Your account balance is $1,000.00") on the chat interface that is visually displayed on the user interface 131a, 131b.

From illustrated process block 510, the computer-implemented method 500 proceeds to illustrated decision block 512, which determines whether the virtual chat communication session is terminated. A number of events may result in termination of the virtual chat communication session, including, but not limited to the user closing the chat window on the client device 100, the user transmitting a command or request (textually and/or verbally) (e.g., "end this chat"), a human virtual support agent manually terminating the virtual chat communication session, the lapse of a predetermined amount of time (e.g., 10 minutes) without receiving any input from the user on the client device 100, the user logging out of the mobile application or desktop application on the client device 100, etc. Note that should no event occur that serves to terminate the virtual chat communication session, then the virtual chat communication session will continue.

Should it be determined that the virtual chat communication session has not been terminated, then the computer-implemented method 500 returns to illustrated process block 506.

Should it be determined that the virtual chat communication session is terminated, then the computer-implemented method 500 proceeds to illustrated decision block 512, in which the computer-executable program code instructs the one or more processors 210 to close the virtual chat communication session processes, and the virtual chat communication session would no longer require resources by the one or more financial institution server(s) 200.

In accordance with one or more embodiments described herein, a user can engage in multiple virtual chat communication sessions in parallel (i.e., contemporaneously or simultaneously) on the same client device 100 with different virtual support agents (human or automated) from a financial institution. This advantageous facilitates the user discussing separate issues using multiple chat interfaces. While the user is waiting for a response from one virtual support agent, he/she may engage in another virtual chat communication session another virtual support agent to discuss another issue. Executing multiple virtual chat communication sessions in parallel on the same client device 100 can also be advantageous in that the user can separate different issues into different respective virtual chat communication sessions, avoiding potential confusion of using a single virtual chat communication session to address different issues. Conducting multiple virtual chat communication sessions in parallel on the same client device 100 can also be advantageous because a user may have one complex issue which requires a human virtual support agent while also having a simple issue which could be addressed by a virtual agent, so utilizing separate virtual chat communication sessions for each (one session with a human virtual support agent and one session with a virtual agent) would preserve resources at the financial institution.

As illustrated in FIG. 6, a computer-implemented method can implement a virtual chat communication session between a user and a human virtual support agent, in accordance with one or more embodiments set forth and described herein. Illustrated process blocks 602 and 604 can be implemented the same as illustrated process blocks 502 and 504, respectively, from FIG. 5.

In illustrated process block 606, the virtual chat communication session for the user is matched with a human virtual support agent. The financial institution may have one or more human virtual support agents having access to the financial institution server(s), and whom have their own client device to facilitate communication with the user via a virtual chat communication session. The computer-executable program code may instruct the one or more processors 210 to match the virtual chat communication session with one of the plurality of human virtual support agents. The matching can be executed randomly, or a human virtual support agent can be selected based on certain criteria (e.g., linguistically compatible with a detected language used by the user, specialized knowledge and/or experience in the financial service being requested by the user, etc.), and/or by user request or command.

From illustrated process block 606, the computer-implemented method 600 proceeds to illustrated process block 608, in which a chat message is received from the client device 100.

From illustrated process block 608, the computer-implemented method 600 proceeds to illustrated process block 610, in which the computer-executable program code may instruct the one or more processors 210 to transmit the chat message to the matched human virtual support agent for this respective virtual chat communication session.

From illustrated process block 610, the computer-implemented method 600 proceeds to illustrated process block 612, in which the computer-executable program code may instruct the one or more processors 210 to receive a response (textually or verbally) from the human virtual support agent, and then transmit the response for visual display on the user interface 131a, 131b of the client device 100.

From illustrated process block 612, the computer-implemented method 600 proceeds to illustrated decision block 614, which determines whether the virtual chat communication session is terminated. This can be done identically to illustrated decision block 514 from FIG. 5.

Should it be determined that the virtual chat communication session is terminated, then the computer-implemented method 600 proceeds to illustrated decision block 616, in which the computer-executable program code instructs the one or more processors 210 to close the virtual chat communication session processes (for this particular virtual chat communication session only. Should there be one or more additional virtual chat communication sessions that are actively executing on the client device 100, those active virtual chat communication sessions would still be visually displayed on the client device 100.

Should it be determined that the virtual chat communication session is not terminated, then the computer-implemented method 600 proceeds returns to illustrated process block 608.

Figure 7:
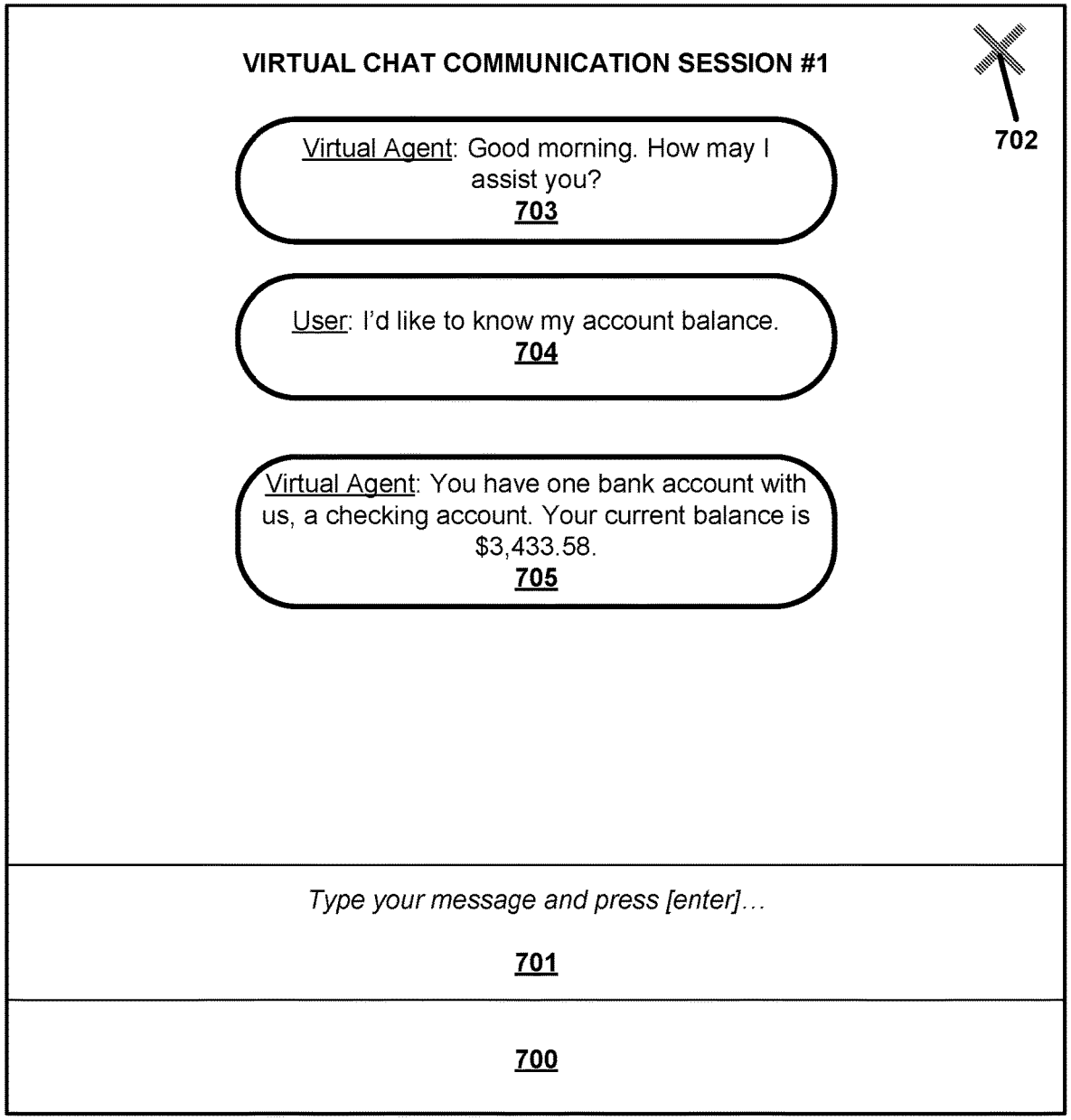
FIG. 7 illustrates a textual chat communication session between a user and an automated virtual support agent, in accordance with one or more embodiments set forth and described herein.

As illustrated in FIG. 7, upon a user launching a financial institution mobile application or desktop application on the client device 100, and being authenticated by the user authentication module 221, the computer-executable program code may instruct the one or more processors 210 to cause a display of a GUI on the user interface 131*a*, 131*b* of the client device 100. The GUI comprises a chat interface (e.g., a chat widget or chat window) 700 that facilitates a virtual chat communication session (e.g., a textual chat or a verbal/audio chat) with a virtual support agent (e.g., an automated virtual support agent or a human virtual support agent) that comprises a plurality of chat messages 703 to 705 visually displayed in chat bubbles between the user and the virtual support agent. The chat messages may be in verbal form or textual form. The user may input text messages via a chat window 701 that are to be processed by the one or more financial institution servers 200 (e.g., via the automated support agent module 224 and/or the human support agent module 225). During the virtual chat communication session, the user may transmit a message 704 comprising a general request or inquiry for information. The computer-executable program code may instruct the one or more processors 210 to analyze the request, and query the financial institution server(s) 200 for an answer to the inquiry and respond by transmitting a message 705 providing information that was requested by the user via the client device 100. In particular, in response to receipt of the user request for information, the computer-executable program code may instruct the one or more processors 210 to cause a visual display of a message on the chat interface on the user interface 131*a*, 131*b* of the client device 100.

In the illustrated example embodiment of FIG. 7, a single chat widget may be utilized to facilitate interaction between a user using the client device 100 and the virtual support agent. In order to increase efficiency, the computer-executable program code may instruct the one or more processors 210 to cause (e.g., via the mobile financial institution application module 223, the automated virtual support agent module 224, and/or the human virtual support agent module 225) the visual display of one or more additional chat widgets on the same chat window. The chat interface 700 may include a user-engageable icon 702 that, when engaged by the user, terminates the current virtual chat communication session by closing the chat interface 700, but not any additional virtual chat communication sessions that are actively executing on the client device 100.

Figure 8:
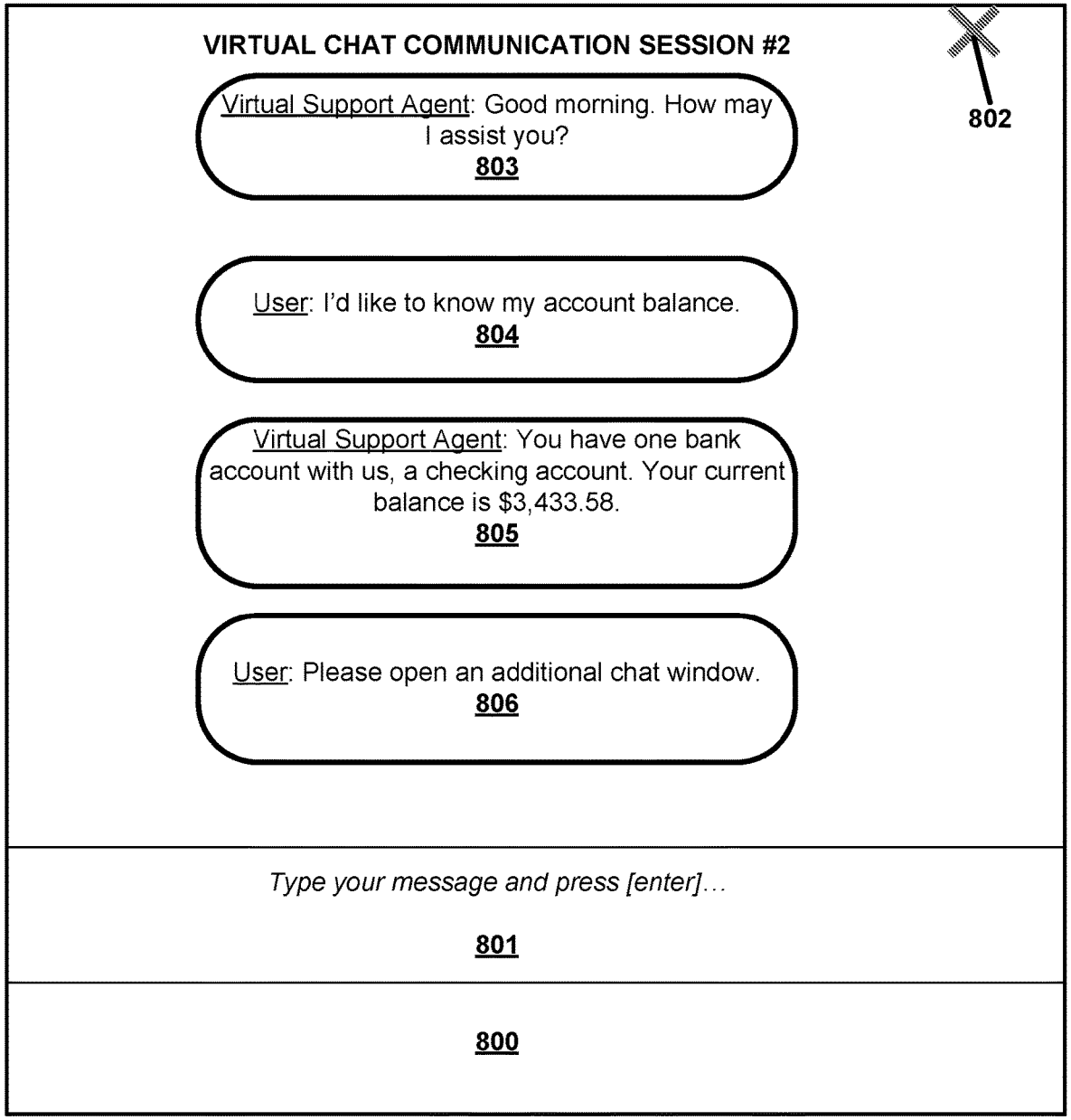
FIG. 8 illustrates a textual chat communication session between a user and an automated virtual support agent with the user requesting an additional chat window by text, in accordance with one or more embodiments set forth and described herein.

Alternatively or additionally, as illustrated in FIG. 8, upon a user launching a financial institution mobile application or desktop application on the client device 100, and being authenticated by the user authentication module 221, the computer-executable program code may instruct the one or more processors 210 to cause a display of a GUI on the user interface 131*a*, 131*b* of the client device 100. The GUI comprises a chat interface (e.g., a chat widget or chat window) 800 that facilitates a virtual chat communication session with a virtual support agent (human virtual support agent or automated virtual support agent) that comprises a plurality of chat messages 803 and 806 visually displayed in chat bubbles between the user and the virtual support agent. The chat messages may be in verbal form or textual form. The user may input text messages via a chat window 801 that are to be processed by the one or more financial institution servers 200 (e.g., via the automated support agent module 224 and/or the human support agent module 225).

During the virtual chat communication session between the user and the virtual support agent, the user can textually request via chat message 806 for an additional chat interface or chat window to facilitate another chat communication session. The computer-executable program code may instruct the one or more processors 210 to cause a display of a second graphical user interface (GUI) on the user interface 131*a*, 131*b* of the client device 100 that facilitates the second virtual chat communication session with a second virtual support agent (human virtual support agent or automated virtual support agent). Note that the virtual chat communication session may be conducted using any natural language, as the virtual support agent will be trained to recognize a variety of phrases with the functionality to open a new chat interface. The chat interface 800 may include a user-engageable icon 802 that, when engaged by the user, terminates the current virtual chat communication session by closing the chat interface 800, but not any additional virtual chat communication sessions that are actively executing on the client device 100.

Figure 9:
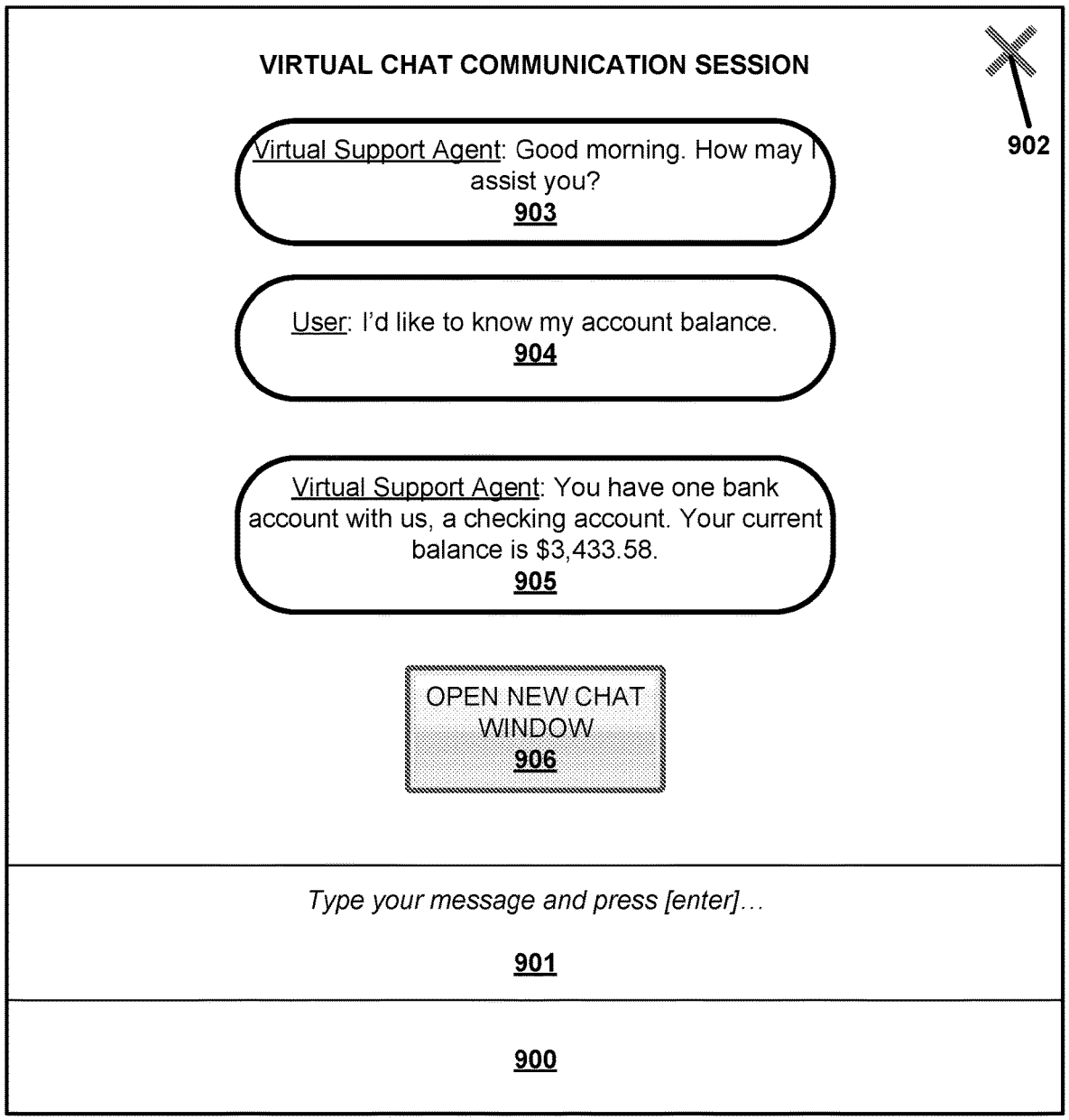
FIG. 9 illustrates a textual chat communication session between a user and an automated virtual support agent, with the GUI for the chat widget providing a button or icon to initiate an additional chat window, in accordance with one or more embodiments set forth and described herein.

Alternatively or additionally, as illustrated in FIG. 9, upon a user launching a financial institution mobile application or desktop application on the client device 100, and being authenticated by the user authentication module 221, the computer-executable program code may instruct the one or more processors 210 to cause a visual display of a GUI on the user interface 131*a*, 131*b* of the client device 100. The GUI comprises a chat interface (e.g., a chat widget or chat window) 900 that facilitates a first virtual chat communication session with a virtual support agent (human virtual support agent or automated virtual support agent) that comprises a plurality of chat messages 903 through 90 visually displayed in chat bubbles between the user and the virtual support agent. The chat messages may be in verbal form or textual form. The user may input text messages via a chat window 901 that are to be processed by the one or more financial institution servers 200 (e.g., via the automated support agent module 224 and/or the human support agent module 225). The chat interface 900 includes a user-engageable icon 906 that facilitates the opening of an additional chat window for an additional virtual chat communication session.

During a first virtual chat communication session that is active, the computer-executable program code may instruct the one or more processors 210 to cause, in response to the user engaging the user-engageable icon 906, a visual display of an additional chat interface on the user interface 131*a*, 131*b* of the client device 100. Note that engaging the user-engageable icon 906 has the same functionality as the user textually or verbally communicating a desire to open an additional chat window. The chat interface 900 may include a user-engageable icon 902 that, when engaged by the user, terminates the current virtual chat communication session by closing the chat interface 900, but not any additional virtual chat communication sessions that are actively executing on the client device 100.

In accordance with one or more embodiments set forth and described herein, multiple simultaneous virtual chat communication sessions can be implemented using a chat window or a chat widget. They both may be administered in the same way and the methods and embodiments set forth herein would apply to both equally. A chat window is a separate window (see FIG. 10) in which a single virtual chat communication session is embodied in a single chat window, with each virtual chat communication session having its own separate chat window. On the other hand, a chat widget can implement simultaneous virtual chat communication sessions inside the same widget, with the virtual chat communication sessions being scrollable within the chat widget (see FIGS. 11 and 12). While the GUI may be different for chat windows and chat widgets, the technical implementation is the same. The system designer can choose whether to implement chats as chat windows (which can be advantageous in that multiple virtual chat communication sessions can be visible to the user simultaneously), chat widgets (which can be advantageous because a chat widget saves space on the GUI when there are multiple simultaneous virtual chat communication sessions actively executing), or a combination of both.

Figure 10:
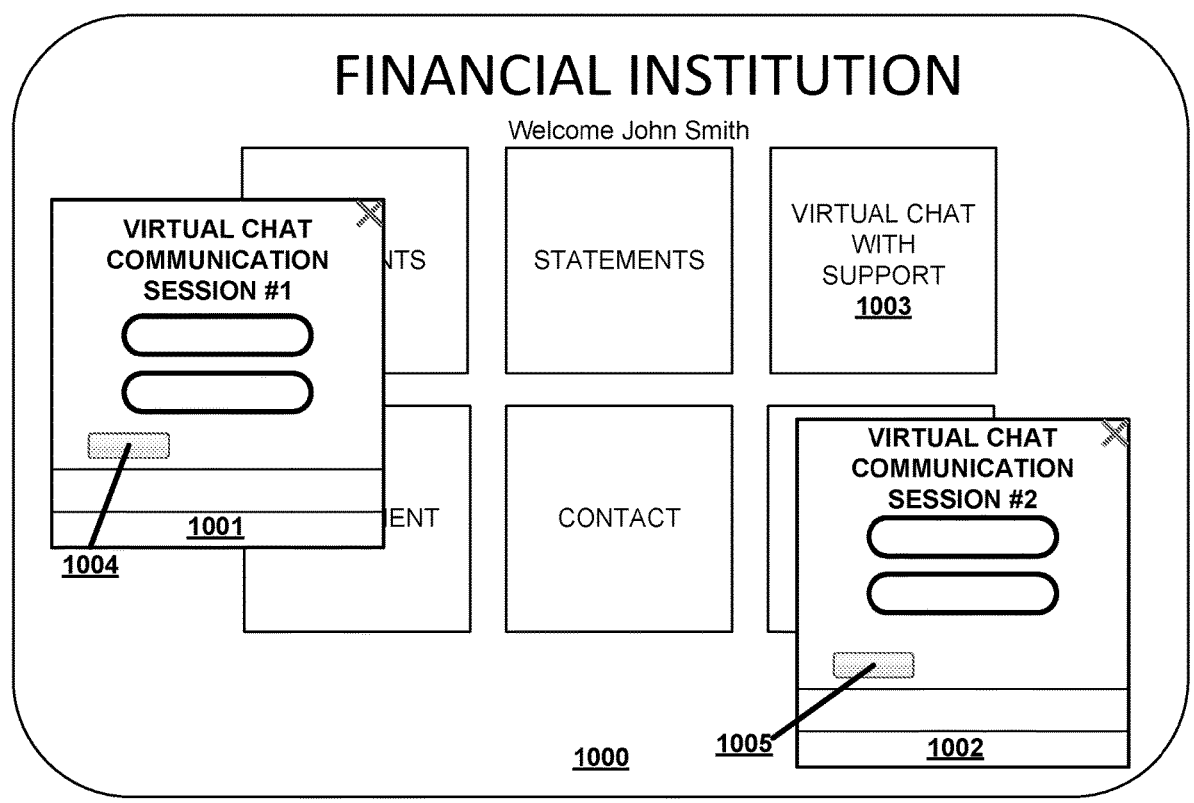
FIG. 10 illustrates a GUI comprising two separate chat windows superimposed on a dashboard, in accordance with one or more embodiments set forth and described herein.

As illustrated in FIG. 10, the computer-executable program code may instruct the one or more processors 210 to cause a visual display of a GUI 1000 comprising a dashboard associated with a financial institution. The GUI 1000 includes a chat interface that comprises a plurality of separate chat windows 1001, 1002 that execute on the client device 100 contemporaneously. A first virtual chat window 1001, corresponding to a first virtual chat communication session between the user and a first virtual support agent, can be visually displayed in response to a user engaging a user-engageable icon 1003 on the GUI 1000. In accordance with one or more embodiments set forth herein, while the first virtual chat communication session is actively executing on the client device 100, the user may again engage the user-engageable icon 1003 to commence a second virtual chat communication session with a second virtual support agent.

Alternatively or additionally, the user may engage a user-engageable icon 1004 visually displayed on the first virtual chat window 1001 to commence the second virtual chat communication session with a second virtual support agent. In response thereto, the computer-executable program code may instruct the one or more processors 210 to cause a visual display of a second virtual chat window 1002, corresponding to a first virtual chat communication session between the user and a first virtual support agent. The chat windows 1001, 1002 may also be displayed using the other methods described herein (e.g., textual command, verbal command, etc.). A user may commence a third virtual chat communication session with a third virtual support agent by either engaging the user-engageable icon 1003 on the GUI 1000 or a user-engageable icon 1005 visually displayed on the second virtual chat window 1002. This may be done in order to commence contemporaneous execution of subsequent virtual chat communication sessions on the client device 100.

Note that each chat window 1001, 1002 may comprise floating action chat windows that are superimposed on the GUI 1000. In this way, each chat window 1001, 1002 may be selectively engaged and dragged around the active area of the GUI 1000 by the user to a desired location on the GUI 1000. Each chat window 1001, 1002 can also be selectively resized by a user by engaging the chat window 1001, 1002. In this manner, the chat windows 1001, 1002 can be relocated and resized to suit any preferences of the user. For example, the user may selectively drag one or both of the chat widgets 1001, 1002 to locations on the GUI 1000 in order to enable the user to visually see certain portions of the GUI 1000 (e.g., a financial account balance) while also conducting one or more virtual chat communication sessions. In that way, certain portions of the GUI 1000 may be accessed by the user without being obscured by the chat widgets 1001, 1002. The user can close each chat window 1001, 1002 by engaging a corresponding user-engageable icon located on the chat window 1001, 1002. This will serve to close that respective chat widget 1001, 1002, but leave any other remaining chat widgets intact.

Note that the virtual chat communication sessions in the chat windows 1001, 1002 are independent of each other, and can be administered by human virtual support agent, an automated virtual support agent (e.g., chatbot), or any combination thereof. For example, a user may request a human virtual support agent on one of the chat windows 1001, 1002 to receive financial servicing (e.g., complex issues), while chatting with an automated virtual support agent in another chat window 1001, 1002 to receive financial servicing (e.g., basic issues that would not require a human virtual support agent). The separate chat windows 1001, 1002 may also be desirable to provide for an easier interaction for the user to break chats down into two separate chats to avoid confusing different issues within a same chat.

As illustrated in FIGS. 11 and 12, the computer-executable program code may instruct the one or more processors 210 to cause a visual display of a GUI 1100 on the user interface 131a, 131b of the client device 100, in accordance with one or more embodiments set forth and described herein. The GUI 1100 comprises a dashboard associated with a financial institution, and includes a chat interface that comprises a single chat widget 1101 superimposed on the dashboard and operable to support a plurality of chat windows within the chat widget 1101. The single chat widget 1101 facilitates multiple virtual chat communication sessions (e.g., textual or verbal) with multiple virtual support agents in a contemporaneous manner. The chat widget 1101 facilitates the support of multiple chat windows, with only one chat window being visible at a time.

In the illustrated example embodiment of FIG. 11, the chat widget 1101 is visible, and includes user-engageable chat icons 1102, 1103 which when engaged by the user, either advances the visible chat window 1105 to a successive chat window (e.g., chat window 1205 in FIG. 12) within the chat widget 1101, or either returns a successive chat window (e.g., chat window 1205 in FIG. 12) to the previous chat window (e.g., chat window 1105 in FIG. 11) within the chat widget 1101.

As illustrated in FIG. 12, the same chat widget 1101 now visually displays a second virtual chat window 1205 with an entirely different virtual chat communication session (having a different virtual support agent) from the first virtual chat window 1105. There is no limit to how many individual chat windows the chat widget 1101 could support (although there may be a practical limit, such as, for example, 10 or 20, etc.). Each individual chat window 1105, 1205, has a user-engageable icon (the 'X' in the upper right of the respective window) which when engaged by the user closes the visible window, but will not close the other chat windows which are active executing but not visible. Closing a chat window means that the one or more processors 210 cause the respective chat window to no longer be visually displayed on the user interface 131a, 131b of the client device 100, and any process(es) associated therewith executing on the financial institution server(s) 200 can be terminated (so long as these process(es) are not being used for any other virtual chat communication sessions). New chat windows can be opened inside the chat widget 1101 by using any methods described herein (e.g., textual command, verbal command, etc.).

All active virtual chat communication sessions can be scrolled through sequentially using the user-engageable advance chat icon 1102 (which displays the next, successive chat window) and the user-engageable previous chat icon 1103 (which displays the previous chat window). All active virtual chat communication sessions can be cycled through using the user-engageable chat icons 1102, 1103. Once a virtual chat communication session has been terminated, the chat window will not be scrolled through as it will no longer exist.

As illustrated in FIGS. 13 and 14, a GUI for a financial institution application executing on a mobile device 100*a* utilizes a single chat widget which supports multiple chat windows, in accordance with one or more embodiments set forth and described herein. FIGS. 13 and 14 are similar to FIGS. 11 and 12, except FIGS. 13 and 14 depict a GUI implemented on a mobile device 100*a*, while the GUI illustrated in FIGS. 9 and 10 can be implemented on both a mobile device 100*a* and a personal computing device 100*b*. A user engaging (e.g., touching or clicking, etc.) the user-engageable advance chat icon 1302 advances to the second virtual chat window 1402 illustrated in FIG. 14. A user engaging (or clicking, etc.) the user-engageable previous chat icon 1303 would return to the first virtual chat window 1402. Should there be more than two active virtual chat communication sessions, a user may scroll through the active chat windows sequentially using the user-engageable advance chat icon 1302 and the user-engageable previous chat icon 1303. As such, all chat windows can be cycled through using the user-engageable advance chat icon 1302 and the user-engageable previous chat icon 1303. Once a virtual chat communication session has been terminated, the chat window will not be scrolled through as it will no longer exist.

As illustrated in FIG. 15 sets forth a GUI that uses a single chat window 1502 which utilizes different colors to visually distinguish each active virtual chat communication session, in accordance with one or more embodiments set forth and described herein. The chat window 1502 facilitates multiple virtual chat communication sessions, with each virtual chat communication session being assigned a different color (and/or shading). A first user-engageable color icon 1504 is visually displayed in a first color. The first user-engageable color icon 1504, when engaged by the user, causes the routing of all textual messages by the user in the chat window 1505 to a first virtual support agent, and displays all textual messages by the virtual support agent in the chat window 1505 in the first color. A second user-engageable color icon 1506 is visually displayed in a second user-engageable color icon 1506 that is different than the first color. The second user-engageable color icon 1506, when engaged by the user, causes of all textual messages by the user in the chat window 1505 to a second virtual support agent, and displays all textual messages by the virtual support agent in the chat window 1505 in the second color. The first color can also have a high contrast (e.g., red and green).

In this manner, the user can easily visually identify between virtual chat communication sessions based on color. The textual message received from the first virtual support agent or the second virtual support agent (or subsequent virtual support agents) would be displayed in the color that specific virtual support agent is associated with, regardless of the last user-engageable color icon that is engaged (the current color). The user is free to continuously selectively engage the first user-engageable color icon 1504 and the second first user-engageable color icon 1506 as desired in order to send text messages typed in the chat window 1510 to the appropriate virtual support agent.

Generally, when the chat window 1502 initially opens, only one virtual chat communication session would be present. Each time, however, the user wishes to initiate another virtual chat communication session (by selectively engaging the user-engageable icon 1508), a new user-engageable color icon (e.g., second user-engageable color icon 1506) will be visually displayed. This will enable the user to engage the second user-engageable icon 1506 to route all textual messages to a second virtual support agent. There is no limit to the number of simultaneous virtual chat communication sessions the user can initiate in the chat window 1502, although there may be a practical limit (e.g., 10 or 20) programmed into the system.

Illustrated example shown in FIGS. 16 and 17 set forth computer-implemented methods 1600, 1800. In one or more examples, the respective flowcharts of the computer-implemented methods 1600, 1800 may be implemented by the one or more processors 210 of the one or more financial institution servers 200. In particular, the computer-implemented methods 1600, 1800 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

As illustrated in FIG. 16, a computer-implemented method 1600 utilizes a single chat window which utilizes different colors for each virtual chat communication session, in accordance with one or more embodiments set forth and described herein. The computer-implemented method 1600 illustrated in FIG. 16 may be be utilized with the other computer-implemented methods for implementing virtual chat communication sessions described herein, and the features illustrated and described with respect to FIG. 16 supplement the other chat features described herein.

In illustrated process block 1602, a first virtual chat communication session is initiated, and chat messages (typed by the user and received by a respective agent) are both associated with a default color (e.g., a first color).

The computer-implemented method 1600 may proceed to illustrated process block 1604, in which a second virtual chat communication session is initiated (e.g., in response to the user selectively engaging the user-engageable icon 1508). The user can also initiate the second virtual chat communication session using any of the methods described herein.

The computer-implemented method 1600 proceeds to illustrated process block 1606, which visually displays all user chat messages in the text box 1510 using the current chat color (after text is typed into the text box 1510 it will then appear above the text box 1510 as part of the dialogue in the current chat color). Text transmitted by the user is routed to an appropriate virtual support agent. Should the current text be assigned the first color, then all user text will be visually associated with the first virtual chat communication session. Should the current text be assigned the second color, then all user text will be visually associated with the second virtual chat communication session.

All chat messages by the virtual support agents will be visually displayed in the color associated with the respective virtual support agent (for example, text by the first virtual support agent will be visually displayed in the first color and text by the second virtual support agent will be visually displayed in the second color).

The computer-implemented method 1600 proceeds to decision block 1608 which determines whether one of the user-engageable color icons 1504, 1506 is engaged. Should the determination be "No," the computer-implemented method 1600 can return to illustrated process block 1606, which continues the virtual chat communication session(s).

Should, one of the user-engageable color icons 1504, 1506 be engaged, then the computer-implemented method 1600 proceeds to illustrated process block 1610, in which the current chat color is changed to the color of the respective color icon 1504, 1506 engaged. Now, all text typed into the text box 1510 by the user will appear in the current chat color and will be routed to the agent associated with the current chat color. The method can return to illustrated process block 1606 to continue the virtual chat communication sessions.

As illustrated in FIG. 17, a computer-implemented method can transmit a link which, when clicked, opens a new virtual chat communication session, in accordance with one or more embodiments set forth and described herein. A virtual chat communication session 1700 may transmit a chat message 1706 with a link 1707 from the virtual support agent to the client device 100 which contains a web link. When the web link is engaged by the user, causes an additional virtual chat communication session to open on the client device 100. The additional virtual chat communication session can be opened using any computer-implemented method described herein (e.g., using a widget, an additional window, a single window using color to differentiate virtual chat communication sessions, etc.) The chat message 1706 having the link 1707 contained therein may be transmitted to the user initially (when the initial virtual chat communication session is initiated), at random, upon user request or command to open a new virtual chat communication session, upon a user-engageable icon being engaged or manipulated by the user, or any other such trigger.

As illustrated in FIG. 18, a computer-implemented method 1800 opens multiple virtual chat communication sessions, in accordance with one or more embodiments set forth and described herein. The virtual chat communication session can be embodied in numerous forms, such as an individual chat window (which may be able to be selectively moved, resized, etc. by the user) and a chat window within a widget (which can incorporate multiple chat windows inside the widget which can be scrolled therebetween).

In illustrated process block 1802, a user request or command is received by the one or more processors 210 to open a first virtual chat communication session. The request to open the first virtual chat communication session can occur in response to a user command (e.g., the user selectively engaging a user-engageable icon on a GUI visually displayed on the client device 100, or by a textual command, or by a verbal command).

The computer-implemented method 1800 then proceeds to illustrated process block 1804, which opens the first virtual chat communication session using a GUI visually displayed on the client device 100. This can be executed as described herein, for example, utilizing the one or more processors 210 to cause the display of the GUI on the user interface 131*a*, 131*b* of the client device 100 to open a virtual chat communication session. The virtual chat communication session may be either an individual chat window for the virtual chat communication session or a chat widget for the virtual chat communication session. The chat widget may be used to execute multiple virtual chat communication sessions inside the same chat widget.

The computer-implemented method 1800 then proceeds to illustrated process block 1806, which includes receives a user request or command on the client device 100 to open an additional virtual chat communication session. The request to open the second virtual chat communication session can occur in response to a user command (e.g., the user selectively engaging a user-engageable icon on a GUI visually displayed on the client device 100, or by a textual command, or by a verbal command).

The computer-implemented method 1800 then proceeds to illustrated process block 1808, which includes opening an additional virtual chat communication session (e.g., by causing a visual display of a new chat window on the GUI or a new chat window within the same widget of the first virtual chat communication session). Should a new chat window be opened (not inside a chat widget), the location of the new chat window on the GUI can be random or placed adjacent to the chat window for the first virtual chat communication session. An additional virtual chat communication session can be opened as described herein, by instructing the one or more processors 210 to communicate with the client device 100 and cause software executing on the client device 100 open an additional virtual chat communication session.

The computer-implemented method 1800 then proceeds to illustrated decision block 1801, which opening another virtual chat communication session by returning to illustrated process block 1806 (or illustrated process block 1802 should there be no current virtual chat communication sessions that are active). Each new virtual chat communication session that is opened would be associated with a newly assigned virtual support agent. Each virtual chat communication session can be conducted by different virtual support agents. Note that for all active virtual chat communication sessions, the user can transmit textual messages for further processing. Should, on the other hand, a new virtual chat communication session is not opened, then the computer-implemented method 1800 can proceed to illustrated process block 1812 which continues the current virtual chat communication sessions. Should a virtual chat communication session not be considered active, it is either terminated and not visible or inaccessible, or terminated and visible but a user is not permitted to send any further textual messages.

In accordance with one or more embodiments set forth, described, and/or illustrated herein, the client device 100 and the one or more financial institution servers 200 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software executing on hardware platform, and one or more virtual machines executing on hardware platform by way of virtualization software. Virtualization software is therefore logically interposed between the physical hardware of hardware platform and guest system software executing "in" virtual machine.

Memory of the hardware platform may store virtualization software and guest system software executing in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for a long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in query, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A financial institution server computer, comprising:
a support agent module;
one or more processors; and
a non-transitory memory coupled to the one or more processors, the non-transitory memory including a set of instructions of computer-executable program code, which when executed by the one or more processors, cause the financial institution server computer to:
cause, via the support agent module during execution of a financial institution mobile application or financial institution desktop application by a client device of a user over a communication network to facilitate user access to and user management of one or more financial accounts maintained by the financial institution, a visual display of a graphical user interface (GUI) comprising a chat widget including a first chat interface and a first user-engageable color icon on the client device to facilitate a first automated virtual chat communication session between the user and a first virtual financial institution support agent in connection with a first financial service offered by the financial institution that is related to the one or more financial accounts;
assign, via the first user-engageable color icon, a first color to the first virtual financial institution support agent and the first virtual chat communication session;
detect a language of a chat message transmitted by the client device;
receive, from the client device contemporaneously with the first virtual chat communication session, a user command to open a second virtual chat communication session in connection with a second financial service offered by the financial institution that is related to the one or more financial accounts, the second financial service being different than the first financial service;
cause, via the support agent module in response to receiving the user command, a visual display of a second chat interface and a second user-engageable color icon in the chat widget to facilitate the second virtual chat communication session contemporaneously with the first virtual chat communication session, with only one chat interface being visible at a time such that the chat widget is superimposed on a financial institution dashboard having content related to the one or more financial accounts; and
assign, via the second user-engageable color icon, a second color to the second virtual financial institution support agent and the second virtual chat communication session, the second color being different than the first color;
match the second virtual chat communication session with a second virtual financial institution support agent among a plurality of virtual financial institution support agents based on a linguistic compatibility with the detected language and a specialized knowledge and/or experience of the second virtual financial institution support agent as it relates to the second financial service; and route chat messages to the first virtual financial institution support agent when the first user-engageable color icon is engaged and chat messages to the second virtual financial institution support agent when the second user-engageable color icon is engaged.

2. The financial institution server computer of claim 1, wherein, temporally after receiving the user command and before causing the visual display of the second chat interface, the set of instructions, which when executed by the one or more processors, causes the financial institution server computer to transmit a user-engageable link in the first chat interface that when engaged by the user, facilitates the visual display of the second chat interface in the chat widget.

3. The financial institution server computer of claim 1, wherein the set of instructions, which when executed by the one or more processors, causes the financial institution server computer to visually distinguish the first chat interface from the second chat interface on the basis of color.

4. The financial institution server computer of claim 1, wherein the chat widget has user-engageable chat icons that enable the user to sequentially switch between the first virtual chat communication session and the second virtual chat communication session within the chat widget.

5. The financial institution server computer of claim 4, wherein the user-engageable chat icons comprises:
 a first user-engageable chat icon that facilitates display of a next, successive active chat interface within the chat widget, and
 a second user-engageable chat icon that facilitates display of a previous active chat interface within the chat widget.

6. A computer program product comprising at least one non-transitory computer readable medium having with a set of instructions of computer-executable program code, which when executed by one or more processors of a financial institution server computer having a support agent module, cause the financial institution server computer to:
 cause, via the support agent module during execution of a financial institution mobile application or a financial institution desktop application by a client device of a user over a communication network to facilitate user access to and user management of one or more financial accounts maintained by the financial institution, a visual display of a graphical user interface (GUI) comprising a chat widget including a first chat interface and a first user-engageable color icon on the client device to facilitate a first virtual chat communication session between the user and a first virtual financial institution support agent in connection with a first financial service offered by the financial institution that is related to the one or more financial accounts;
 assign, via the first user-engageable color icon, a first color to the first virtual financial institution support agent and the first virtual chat communication session;
 detect a language of a chat message transmitted by the client device;
 receive, from the client device contemporaneously with the first virtual chat communication session, a user command to open a second virtual chat communication session in connection with a second financial service offered by the financial institution that is related to the one or more financial accounts, the second financial service being different than the first financial service;

cause, via the support agent module in response to receiving the user command, a visual display of a second chat interface and a second user-engageable color icon in the chat widget to facilitate the second virtual chat communication session contemporaneously with the first virtual chat communication session, with only one chat interface being visible at a time such that the chat widget is superimposed on a financial institution dashboard having content related to the one or more financial accounts; and assign, via the second user-engageable color icon, a second color to the second virtual financial institution support agent and the second virtual chat communication session, the second color being different than the first color;

match the second virtual chat communication session with a second virtual financial institution support agent among a plurality of virtual financial institution support agents based on a linguistic compatibility with the detected language and a specialized knowledge and/or experience of the second virtual financial institution support agent as it relates to the second financial service; and route chat messages to the first virtual financial institution support agent when the first user-engageable color icon is engaged and chat messages to the second virtual financial institution support agent when the second user-engageable color icon is engaged.

7. The computer program product of claim 6, wherein, temporally after receiving the user command and before causing the visual display of the second chat interface, the set of instructions, which when executed by the one or more processors, causes the financial institution server computer to transmit a user-engageable link in the first chat interface that when engaged by the user, facilitates the visual display of the second chat interface in the chat widget.

8. The computer program product of claim 6, wherein the set of instructions, which when executed by the one or more processors, causes the financial institution server computer to visually distinguish the first chat interface from the second chat interface on the basis of color.

9. The computer program product of claim 6, wherein the chat widget has user-engageable chat icons that enable the user to sequentially switch between the first virtual chat communication session and the second virtual chat communication session within the chat widget.

10. The computer program product of claim 9, wherein the user-engageable chat icons comprises:
 a first user-engageable chat icon that facilitates display of a next, successive active chat interface within the chat widget, and
 a second user-engageable chat icon that facilitates display of a previous active chat interface within the chat widget.

11. A computer-implemented method, comprising:
 causing, by one or more financial institution server computers having a support agent module during execution of a financial institution mobile application or a financial institution desktop application by a client device of a user over a communication network to facilitate user access to and user management of one or more financial accounts maintained by the financial institution, a visual display of a graphical user interface (GUI) comprising a chat widget including a first chat interface and a first user-engageable color icon on the client device to facilitate a first virtual chat communication session between the user and a first virtual financial institution support agent in connection with a first financial service offered by the financial institution that is related to the one or more financial accounts;

assigning, via the first user-engageable color icon, a first color to the first virtual financial institution support agent and the first virtual chat communication session;

detecting, by the one or more financial institution server computers, a language of a chat message transmitted by the client device;

receiving, by the one or more financial institution server computers from the client device contemporaneously with the first virtual chat communication session, a user command to open a second virtual chat communication session in connection with a second financial service offered by the financial institution that is related to the one or more financial accounts, the second financial service being different than the first financial service;

causing, by the one or more server computers via the support agent module in response to receiving the user command, a visual display of a second chat interface and a second user-engageable color icon in the chat widget to facilitate the second virtual chat communication session contemporaneously with the first virtual chat communication session, with only one chat interface being visible at a time such that the chat widget is superimposed on a financial institution dashboard having content related to the one or more financial accounts;

assigning, via the second user-engageable color icon, a second color to the second virtual financial institution support agent and the second virtual chat communication session, the second color being different than the first color;

matching, by the one or more server computers, the second virtual chat communication session with a second virtual financial institution support agent among a plurality of virtual financial institution support agents based on a linguistic compatibility with the detected language and a specialized knowledge and/or experience of the second virtual financial institution support agent as it relates to the second financial service; and routing chat messages to the first virtual financial institution support agent when the first user-engageable color icon is engaged and chat messages to the second virtual financial institution support agent when the second user-engageable color icon is engaged.

12. The computer-implemented method of claim 11, further comprising, by the one or more financial institution server computers temporally after receiving the user command and before causing the visual display of the second chat interface, transmitting a user-engageable link in the first chat interface, that when engaged by the user, facilitates the visual display of the second chat interface in the chat widget.

13. The computer-implemented method of claim 11, further comprising, by the one or more financial institution server computers, visually distinguishing the first chat interface from the second chat interface on the basis of color.

14. The computer-implemented method of claim 11, wherein:

the chat widget has user-engageable chat icons that enable the user to sequentially switch between the first virtual chat communication session and the second virtual chat communication session within the chat widget, and the user-engageable chat icons comprises a first user-engageable chat icon that facilitates display of a next, successive active chat interface within the chat widget, and a second user-engageable chat icon that facilitates display of a previous active chat interface within the chat widget.

* * * * *